United States Patent [19]
Patterson et al.

[11] Patent Number: 5,796,715
[45] Date of Patent: Aug. 18, 1998

[54] NON-BLOCKING DYNAMIC FAST PACKET SWITCH FOR SATELLITE COMMUNICATION SYSTEM

[75] Inventors: David Palmer Patterson, Los Altos; Moshe L. Liron, Palo Alto, both of Calif.

[73] Assignee: Teledesic Corporation, Kirkland, Wash.

[21] Appl. No.: 241,984

[22] Filed: May 12, 1994

Related U.S. Application Data

[63] Continuation-in-part of Ser. No. 790,805, Nov. 8, 1991, abandoned.

[51] Int. Cl.$^6$ .................................................. H04L 12/56
[52] U.S. Cl. ............................ 370/60; 370/94.1; 455/12.1
[58] Field of Search ........................... 370/60, 94.1, 60.1, 370/95.1, 95.3, 54, 58.2; 455/33.1–33.4, 56.1, 12.1, 13.1, 13.2, 13.3, 13.4, 17, 38.3; 379/59, 60, 61, 58; 364/449, 450; 342/354, 357; 244/158.12

[56] References Cited

U.S. PATENT DOCUMENTS

| | | | |
|---|---|---|---|
| 5,377,182 | 12/1994 | Monacos | 370/94.1 |
| 5,386,953 | 2/1995 | Stuart | 244/158 R |
| 5,408,237 | 4/1995 | Patterson et al. | 379/58 |
| 5,527,001 | 6/1996 | Stuart | 244/158 R |

*Primary Examiner*—Dang Ton
*Attorney, Agent, or Firm*—Anglin & Giaccherini

[57] ABSTRACT

The present invention overcomes the limitations encountered by conventional packet switching using virtual circuits. The present invention utilizes a "datagram" approach that routes every packet (22) conveyed by the system independently at every node in the network. The packets (22) are directed along an optimized pathway through the network by a fast packet switch (38) that directs traffic based on instructions from an adaptive routing processor (12A) that continuously runs an adaptive routing software (12B). This adaptive routing processor (14) supplies an output (12C) to a routing cache memory (20) which stores fast packet switch routing port output tags (30). An input packet processor (28) extracts a supercell address from the header (24) of each packet (22) and uses the supercell address (21A) as an index to retrieve a fast packet switch output port tag (30) stored in the routing cache memory (20). This tag (30) is prepended to the packet (22), and sent to an input port (36) of the fast packet switch (38), which includes a number of multi-stage self-routing switch modules (132) and a number of asynchronous packet multiplexors (134). The modules (132) and multiplexors (134) route the tagged packet (34) to an output port (40) which is connected either to a scanning beam antenna (SBA) or an intersatellite link antenna (ISA).

1 Claim, 32 Drawing Sheets

Microfiche Appendix Included
(3 Microfiche, 235 Pages)

364 SINGLE SWITCHING CELL

NON-BLOCKING DYNAMIC FAST PACKET SWITCH FOR SATELLITE COMMUNICATION SYSTEM

This application is a continuation in part of Ser. No. 07/790,805 filed Nov. 8, 1991, now abandoned.

CLAIM FOR PRIORITY

The present application is a Continuation in Part application. The inventors hereby claim the benefit of priority under Section 120 of Title 35 of the United States Code of Laws for any and all subject matter which is commonly disclosed in the present application and in a pending patent application entitled Switching Methods for Satellite Communication System by David Palmer Patterson & Moshe Lerner Liron, filed on Nov. 8, 1991 and assigned U.S. Ser. No. 07/790,805 now abandoned.

REFERENCE TO MICROFICHE APPENDICES

This specification is accompanied by two Appendices recorded on three sheets of microfiche, 235 pages, which contain software that may be employed to practice the invention. The first software listing may be used to implement that portion of the present invention which pertains to Autonomous Orbit Position Determination. The second software listing may be used to implement that portion of the present invention which pertains to Adaptive Routing. Both software programs were written for conventional personal computers and may be run on IBM Compatible systems employing a conventional DOS operating system. These software programs simulate selected embodiments of the present invention which are described below in full detail. The programs enable a person of ordinary skill in the arts to which the present invention pertains to practice the invention without undue experimentation.

CROSS-REFERENCES TO RELATED PATENT APPLICATIONS

The present patent application is related to the following commonly-owned and commonly-assigned pending patent applications:

Satellite Communication System by Edward Fenton Tuck et al., filed on 28 Feb. 1994 and assigned U.S. Ser. No. 08/203,140, and claiming the benefit of priority of a parent application entitled Satellite Communication System by Edward F. Tuck et al., filed on 28 Oct. 1991, and assigned U.S. Ser. No. 07/783,754 now abandoned;

Terrestrial Antennas for Satellite Communication System by Asu Ram Jha, filed on 02 Dec. 1993 and assigned U.S. Ser. No. 07/984,609, and claiming the benefit of priority of a parent application entitled Terrestrial Antennas for Satellite Communication System by Asu Ram Jha, filed on Nov. 8, 1991, and assigned U.S. Ser. No. 07/790,273 now abandoned;

Earth-Fixed Cell Beam Managementfor Satellite Communication System by David Palmer Patterson and Mark Alan Sturza, filed on 08 Jul. 1993 and assigned U.S. Ser. No. 08/088,714 now U.S. Pat. No. 5,408,237, and claiming the benefit of priority of a parent application entitled Beam Compensation Method for Satellite Communication System by David Palmer Patterson and Mark Alan Sturza, filed on 08 Nov. 1991 and assigned U.S. Ser. No. 07/790,318 now abandnoned;

Spacecraft Antennas & Beam Steering Methodsfor Satellite Communication System by Douglas Gene Lockie et al., filed on 11 May 1994 and not presently assigned a U.S. Serial Number, and claiming the benefit of priority of a parent application entitled Spacecraft Antennas & Beam Steering Methods for Satellite Communication System by Douglas Gene Lockie, filed on 28 Oct. 1992 and assigned U.S. Ser. No. 07/967,988 now abandoned and claiming the benefit of priority of a parent application entitled Spacecraft Antennas & Beam Steering Methods for Satellite Communication System by Douglas Gene Lockie, filed on 08 Nov. 1991 and assigned U.S. Ser. No. 07/790,271 now abandoned;

Inflatable Torus & Collapsible Hinged Disc Spacecraft Designs for Satellite Communication System by James R. Stuart et al., filed on 05 May 1994 and not presently assigned a U.S. Serial Number, and claiming the benefit of priority of a parent application entitled Spacecraft Designs for Satellite Communication System by James R. Stuart, filed on 18 Aug. 1992 and assigned U.S. Ser. No. 07/931,625 now U.S. Pat. No. 5,386,953, which claims the benefit of priority of a parent application entitled Spacecraft Designs for Satellite Communication System by James R. Stuart, filed on 08 Nov. 1991 and assigned U.S. Ser. No. 07/790,748 now abandoned.

Spacecraft Intersatellite Link for Satellite Communication System by Douglas G. Lockie et al., filed on Jul. 16, 1992 and assigned U.S. Ser. No. 07/915,172;

Method of Conducting a Telecommunications Business Implemented on a Computer by Edward F. Tuck, filed on Jun. 8, 1992 and assigned U.S. Ser. No. 07/895,295 now abandoned;

Traffic Routing for Satellite Communication System by Moshe Lerner Liron, filed on Feb. 9, 1993 and assigned U.S. Ser. No. 08/016,204 now abandoned; and Modular Communication Satellite by James R. Stuart, filed on Jun. 11, 1993 and assigned U.S. Ser. No. 08/075,425 now U.S. Pat. No. 5,527,001.

FIELD OF THE INVENTION

The present invention relates to the field of satellite communications. More particularly, this invention provides a fast packet switch for a network having a dynamic, rapidly changing topology. Each packet moved through the network is routed independently at each network node along an optimum route that is selected by the switch. A novel combination of self-routing switch modules with packet priority multiplexors provides an efficient switch which substantially reduces blocking of packets.

BACKGROUND OF THE INVENTION

Conventional public switched telephone systems utilize geosynchronous satellite networks to relay a small portion of long distance telephone traffic. Some of the radio signals that convey these telephone calls are grouped into sequences of digital bits called "packets." In conventional networks packets are carried to their destination through a pathway called a "virtual circuit. " A virtual circuit is a route through a network from an origin to a destination that is established at the initiation of a call, and then is released when the call is terminated. The virtual circuit defines a path that includes nodes and links in the network that are used by all the packets associated with the virtual circuit. The packets arrive at their destinations by following instructions or maps that are generated at the origin of the call. Any change in network topology after the call is initiated and the packet itinerary is generated, such as the failure of a node or link, causes a discontinuity in the virtual circuit. When the virtual circuit is disturbed, the packet's itinerary is no longer valid, and the call is disconnected. Reestablishing a broken call by generating a new virtual circuit every time a failure occurs is a lengthy, inefficient and expensive process.

Conventional systems that employ packets that are switched through virtual circuits are capable of providing reliable communications service in networks that are static. If the nodes and the links connecting the nodes are dynamic, the use of packets that follow directions along a fixed itinerary in a virtual circuit that was mapped at the origin of the call becomes impractical. A satellite communications system that utilizes satellites in geosynchronous orbit is generally a static system, since the spacecraft do not change position appreciably relative to relay stations on the ground beneath them. Geosynchronous satellites, however, operate in very high 22,000 mile orbits, and the propagation delays inherent in conveying signals over a nearly 50,000 mile round-trip are not acceptable for many telephone environments.

This intolerably long transit delay is only one of several reasons that militate against the use of high Earth orbit geostationary satellites for a world-wide communications system. One alternative to a geosynchronous system is a constellation of satellites operating in low Earth orbits. In the past, this alternative was not viable, because conventional switching methods that employ packets routed through static virtual circuits using itineraries generated at the origin of a call can not cope with the rapidly changing topology of a low Earth orbit network. No single public communications network is presently capable of offering continuous global service to a wide variety of customers using mobile, portable, and fixed terminals. The problem of providing an economically viable, 24-hour, world-wide network for voice, data, and video has presented a major challenge to the communications business. The development of a fast packet switch which could direct packetized call traffic through a constantly changing network would constitute a major technological advance and would satisfy a long felt need within the electronics and telephone industries.

SUMMARY OF THE INVENTION

The Non-Blocking Dynamic Fast Packet Switch for a Satellite Communication System overcomes the limitations encountered by conventional packet switches that use virtual circuits. The present invention utilizes a "datagram" approach that routes every packet conveyed by the system independently at every node in the network. The packets are directed along an optimized pathway through the rapidly changing network by a fast packet switch that directs traffic based on computations supplied by an adaptive routing microprocessor that continuously runs adaptive routing software. This microprocessor uses orbital position information generated by an autonomous orbit determination microprocessor aboard each spacecraft to monitor the rapidly changing topology of the constellation and the distribution of traffic among its nodes and links. The present invention employs a novel combination of 1×32 self-routing switch modules and 32×1 asynchronous packet multiplexors to substantially eliminate packet blocking that may otherwise interrupt the operation of the switch. The present invention is a vital element of a novel Satellite Communication System, which is described in a related patent application that is referred to above.

One embodiment of the present invention comprises an autonomous orbit determination (AOD) microprocessor, an adaptive routing (AR) processor, an input packet processor, a routing cache memory, and a fast packet switch. The AOD microprocessor computes the orbital positions of all the satellites in the network to the AR microprocessor. The AR microprocessor estimates delays for various transmission pathways through the network. The input packet processor extracts a supercell address from each packet, and uses it to read a fast packet switch output port tag stored in the routing cache memory. This output port tag is prepended to the packet by a packet tagger within the input packet processor. The packet and the prepended tag are then conveyed to the fast packet switch. Packets are directed through the fast packet switch by self-routing switch modules and multiplexors that work in combination to substantially eliminate packet blocking. The present invention optimizes the utilization of the network facilities, minimizes transmission delays and variances of transmission delays. By estimating the optimal route for each packet one step at a time, the amount of time required to process individual packets is greatly reduced.

An appreciation of other aims and objectives of the present invention and a more complete and comprehensive understanding of this invention may be achieved by studying the following description of preferred and alternative embodiments and by referring to the accompanying drawings.

A BRIEF DESCRIPTION OF THE DRAWINGS

Figure 1A:
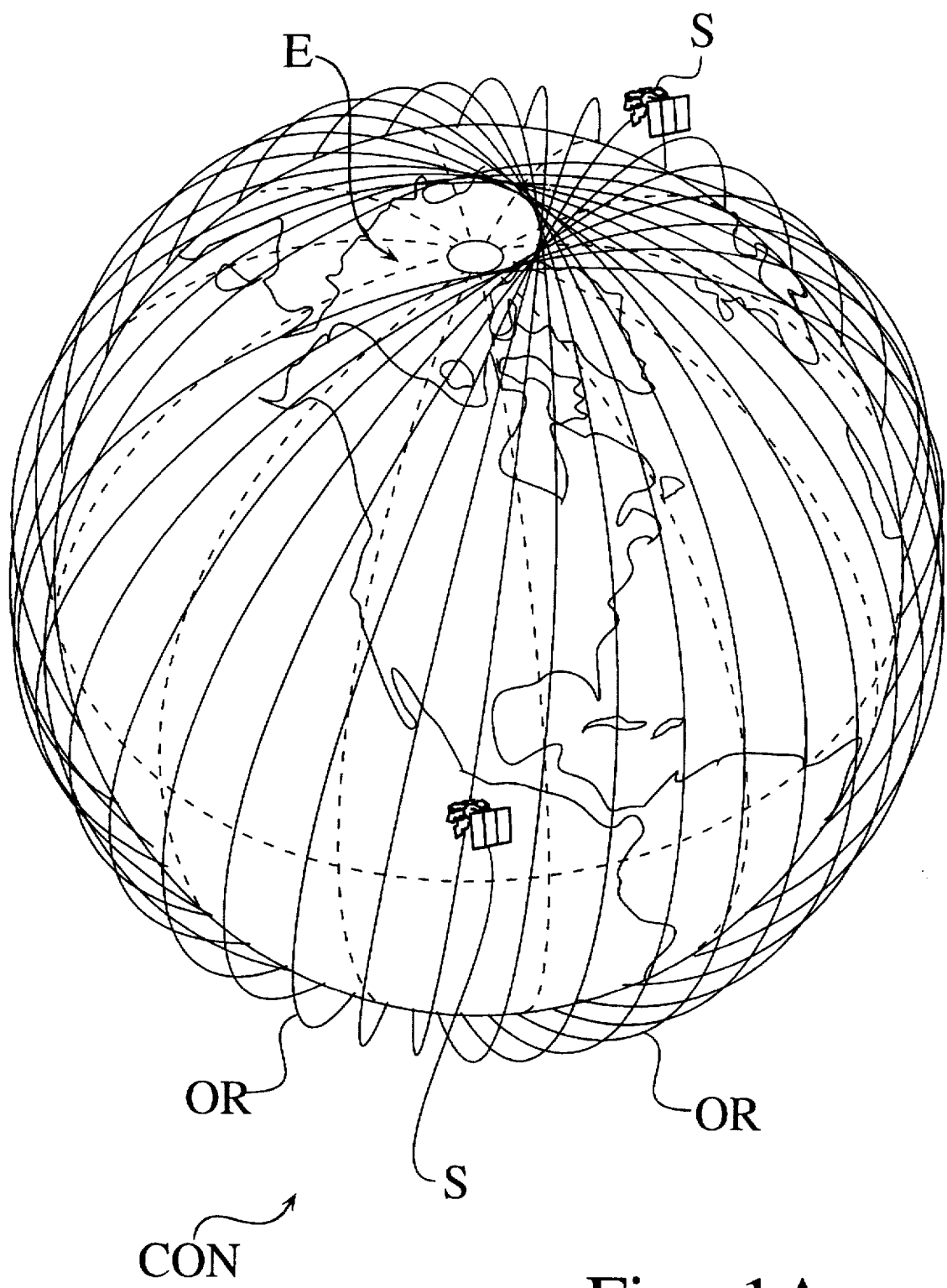
FIG. 1A is a schematic diagram of a portion of a Satellite Communication System orbiting the Earth.
Figure 1B:
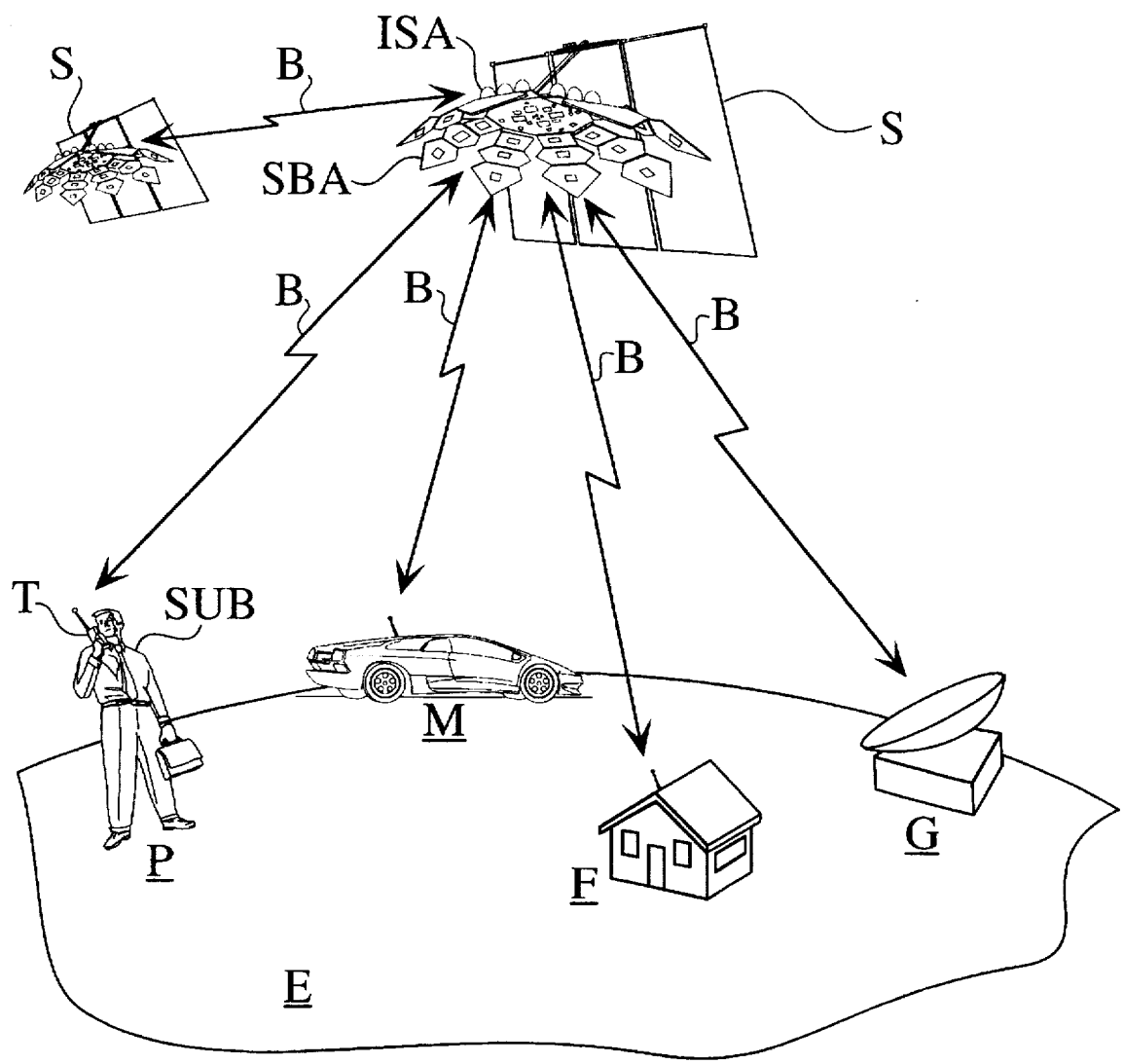
FIG. 1B is an illustration of communications among satellites, portable, mobile and fixed terminals and gateways.
Figure 1C:
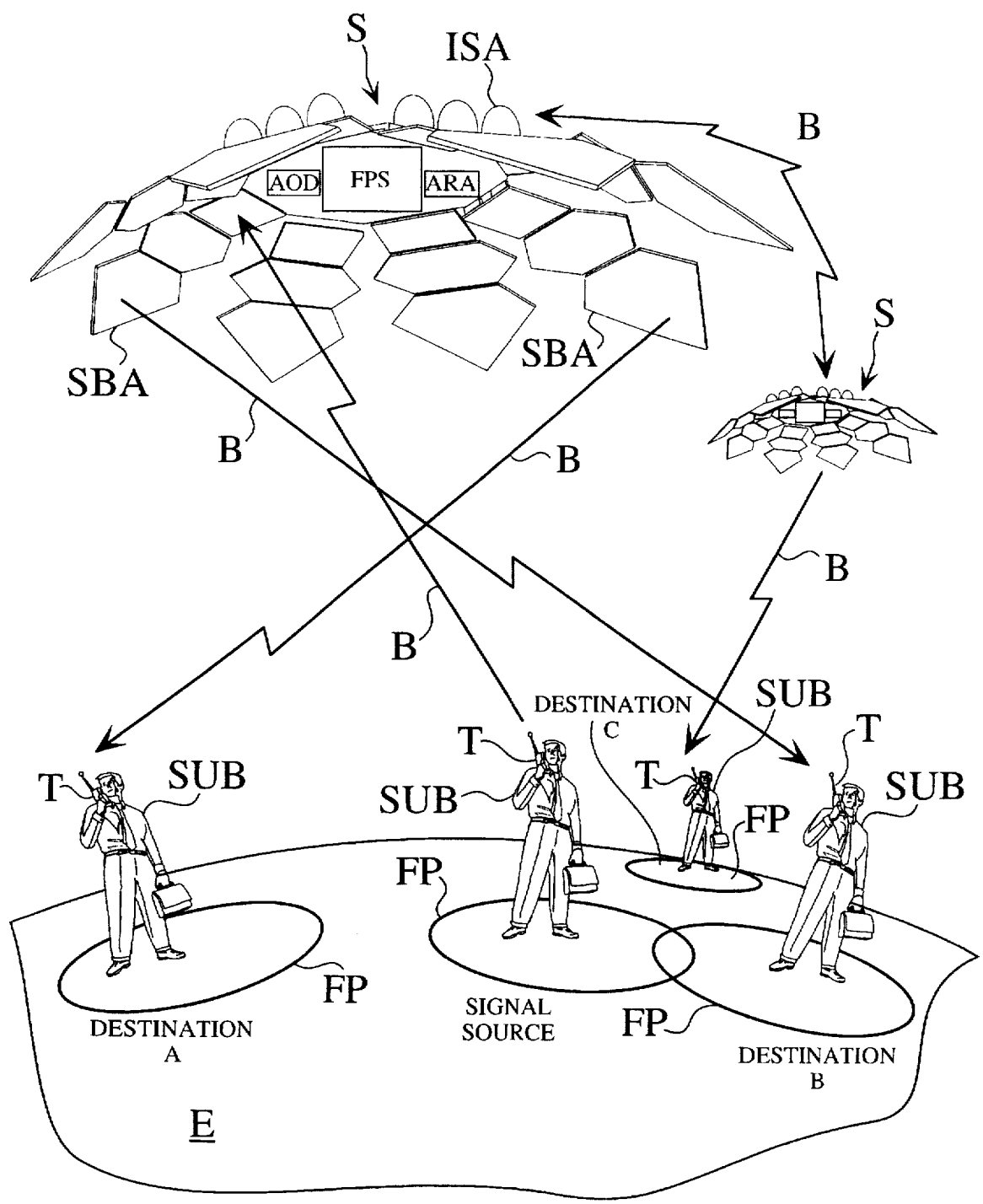
FIG. 1C depicts satellites in orbit communicating with subscribers in different beam footprints formed on the Earth's surface.
Figure 1D:
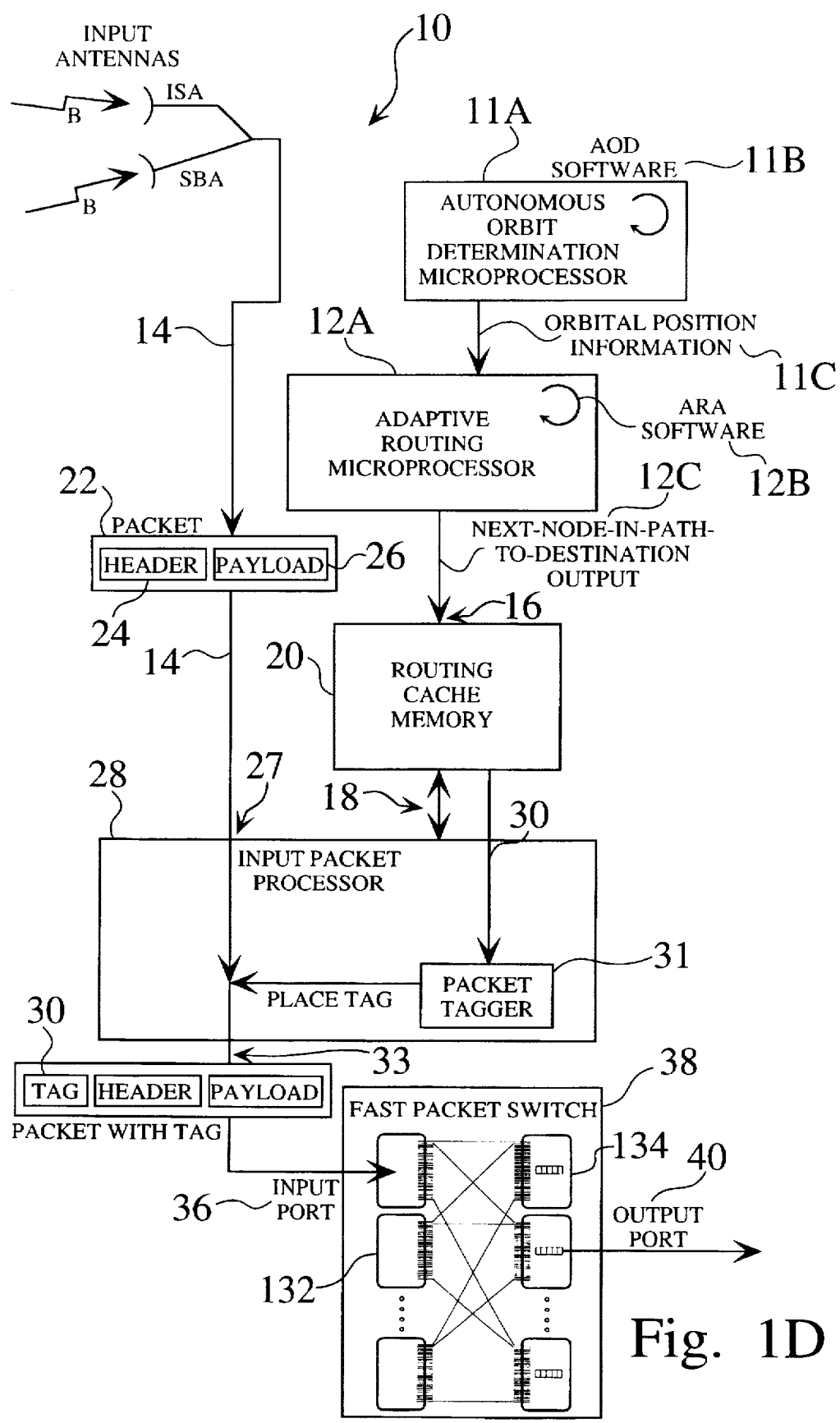
FIG. 1D is a flowchart that shows the generalized operation of the switching process of the preferred embodiment of the present invention.
Figure 1E:
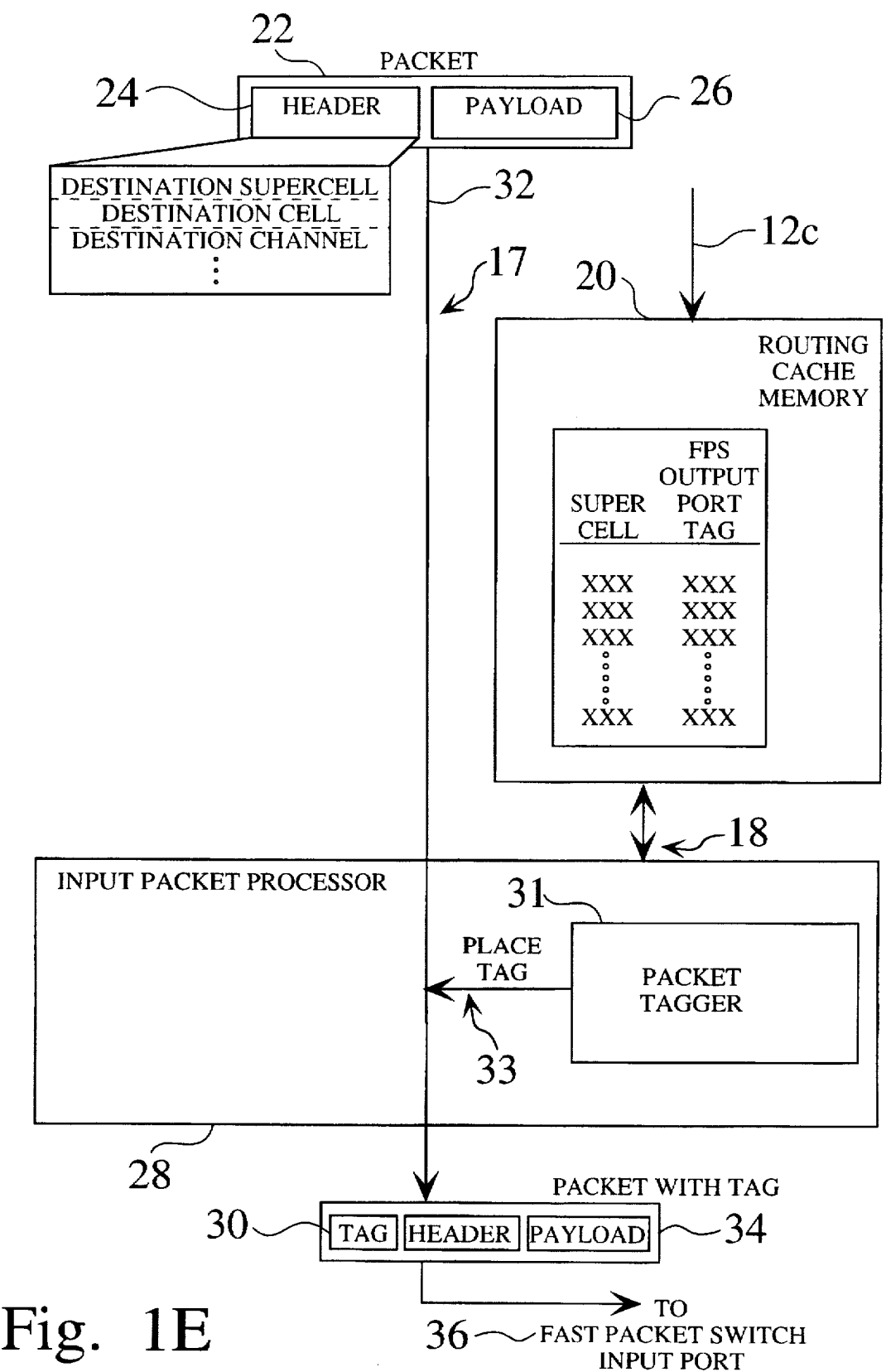

FIG. 1E reveals details of the flowchart presented in FIG. 1D.

Figure 1F:
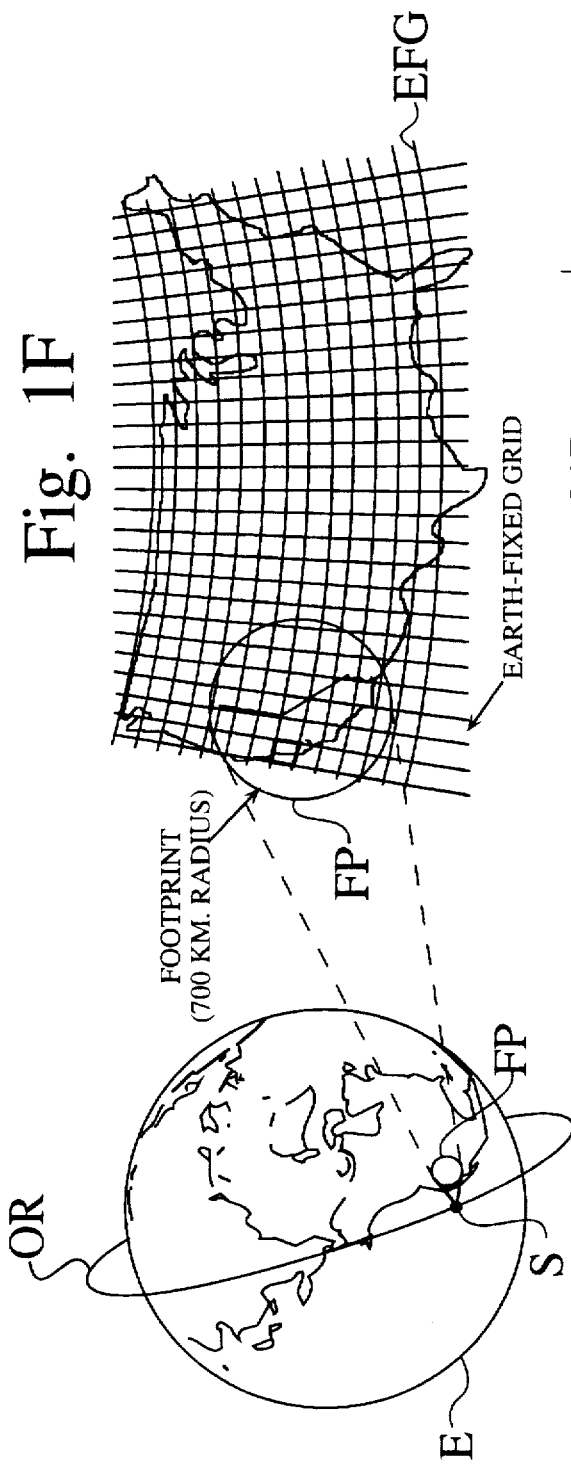

FIG. 1F is a diagram that reveals the incidence of radio beams from a satellite that form a footprint over California. FIG. 1F also shows an Earth-fixed grid comprising supercells which cover the continental United States.

Figure 1G:
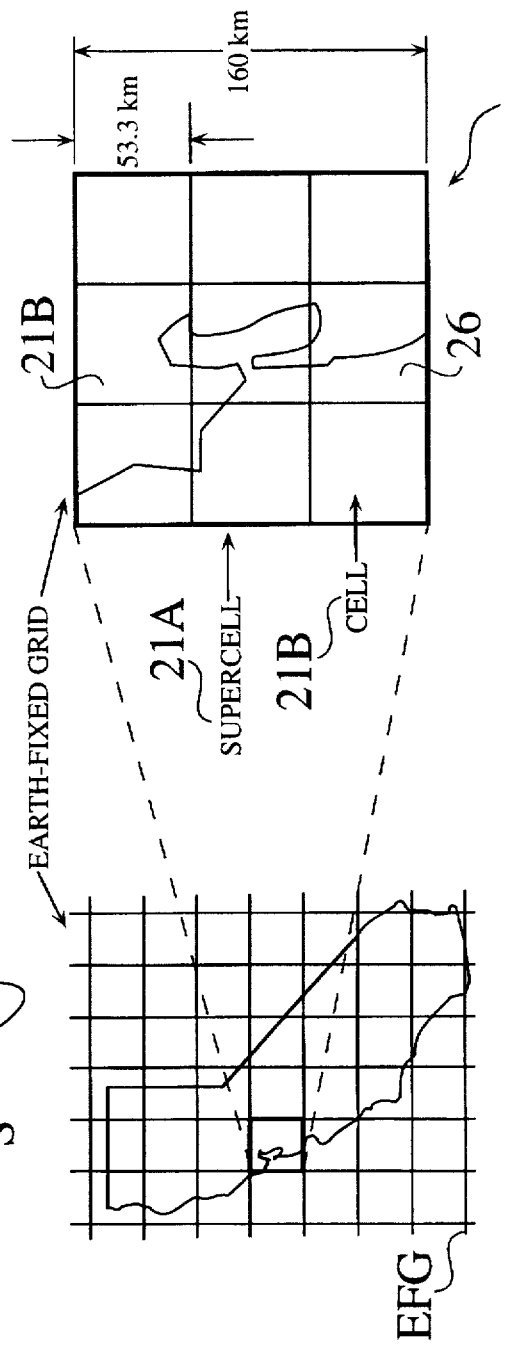

FIG. 1G also depicts the relationships among the Earth-fixed grid, a supercell and the nine cells within the supercell.

Figure 2:
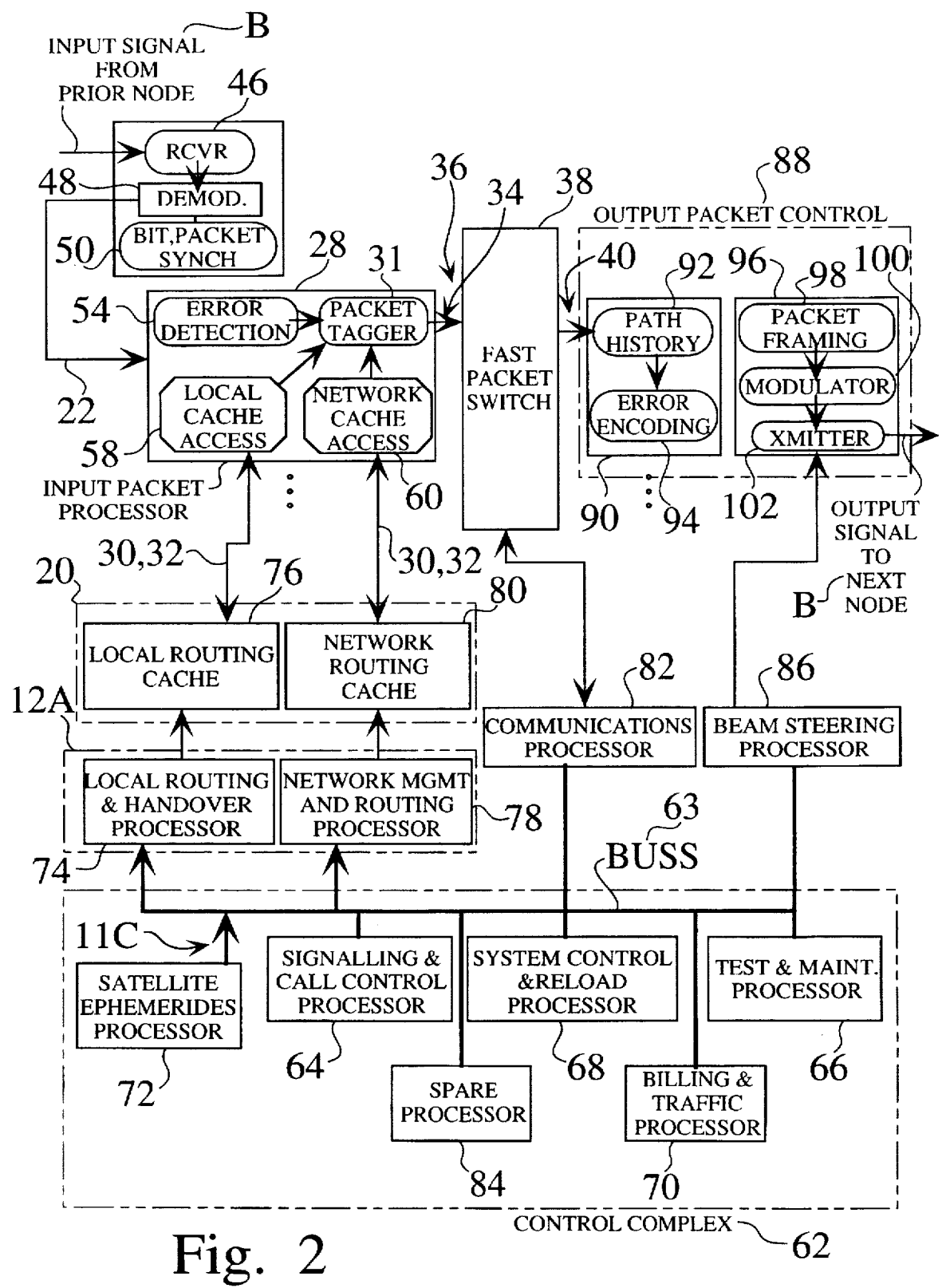

FIG. 2 presents a block diagram of a satellite switch node that includes the fast packet switch.

Figure 3:
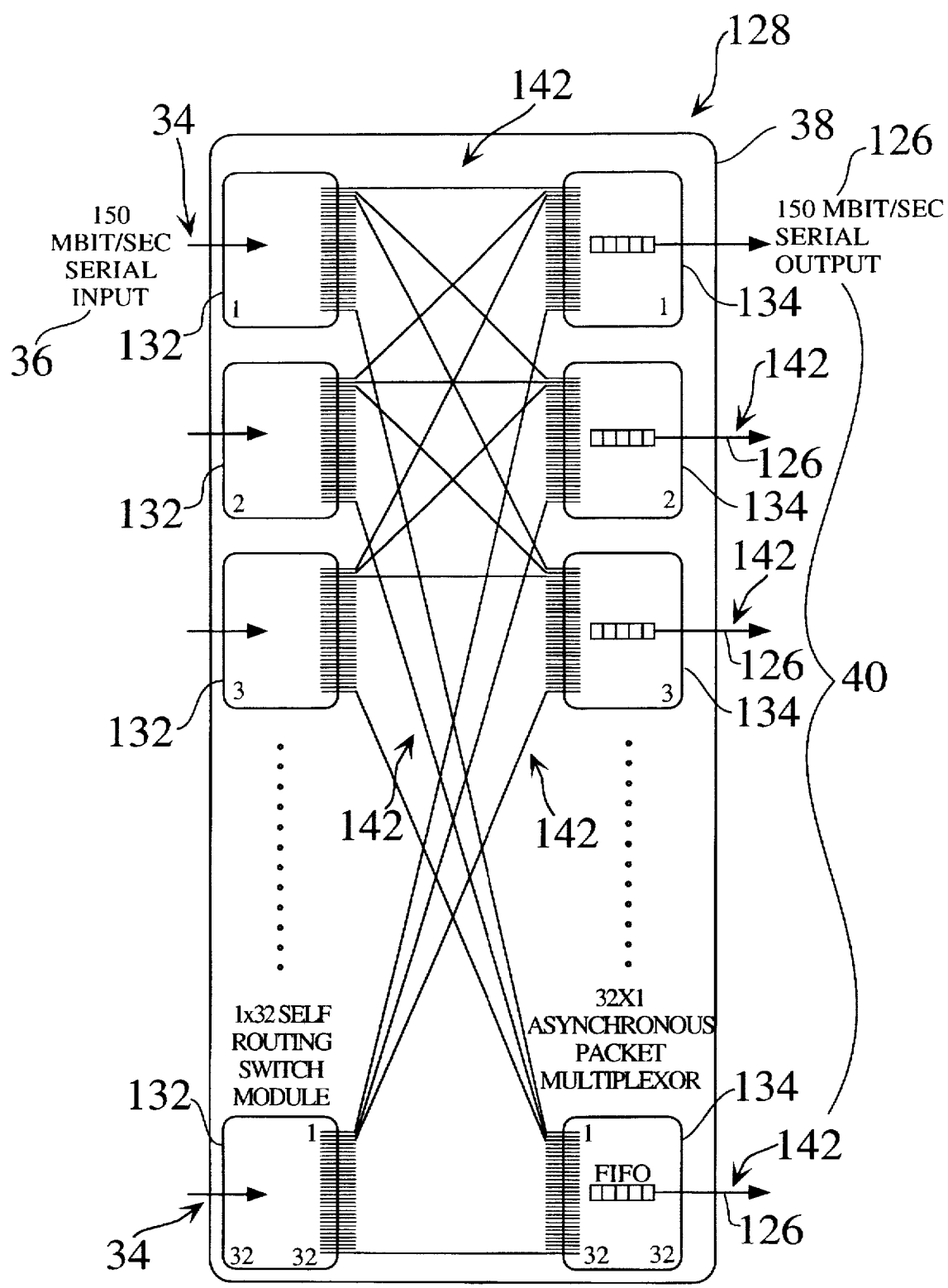

FIG. 3 reveals a block diagram of a fast packet switch.

Figure 4:
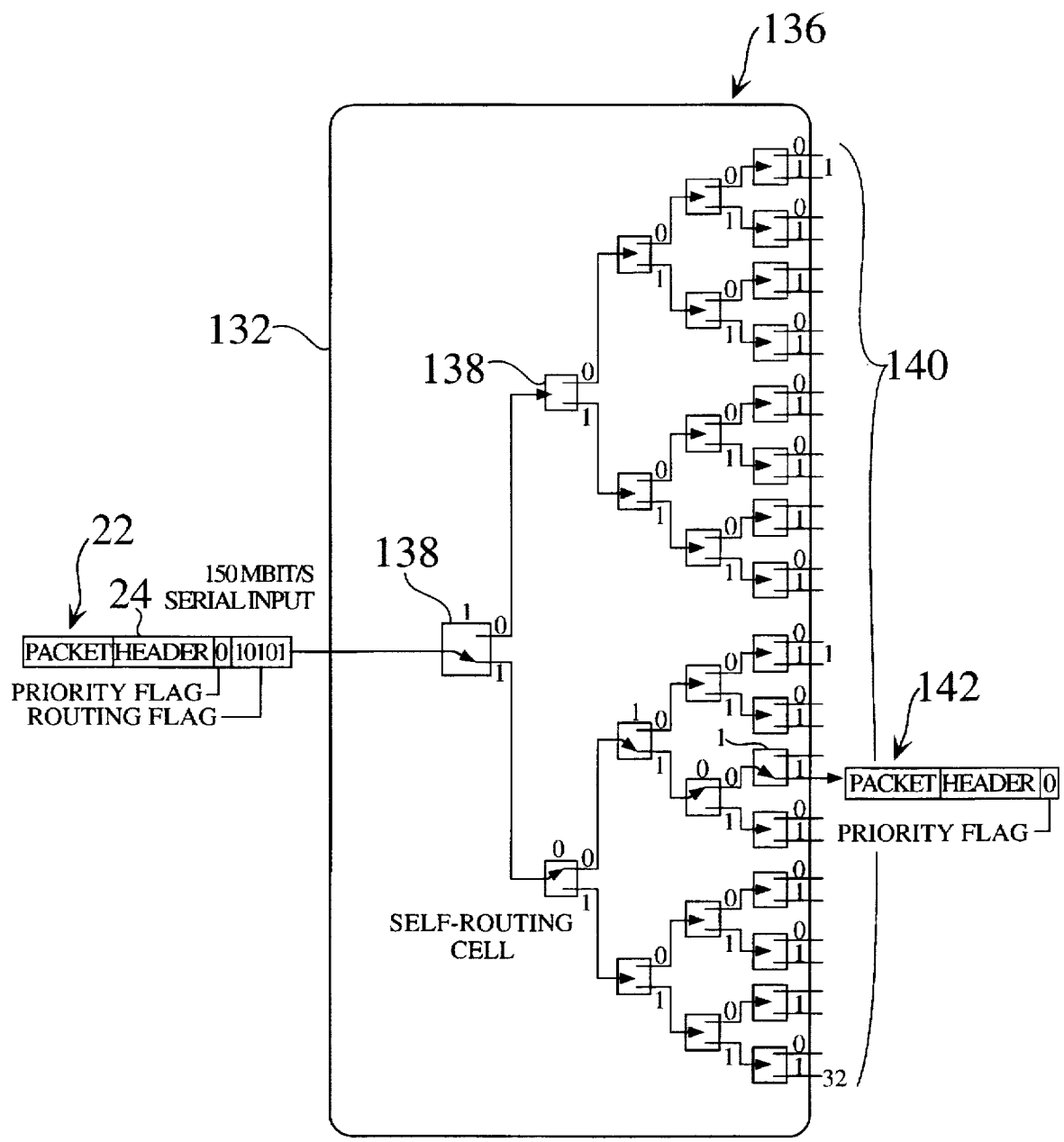

FIG. 4 shows a 1 by 32 self-routing switch module.

Figure 5:
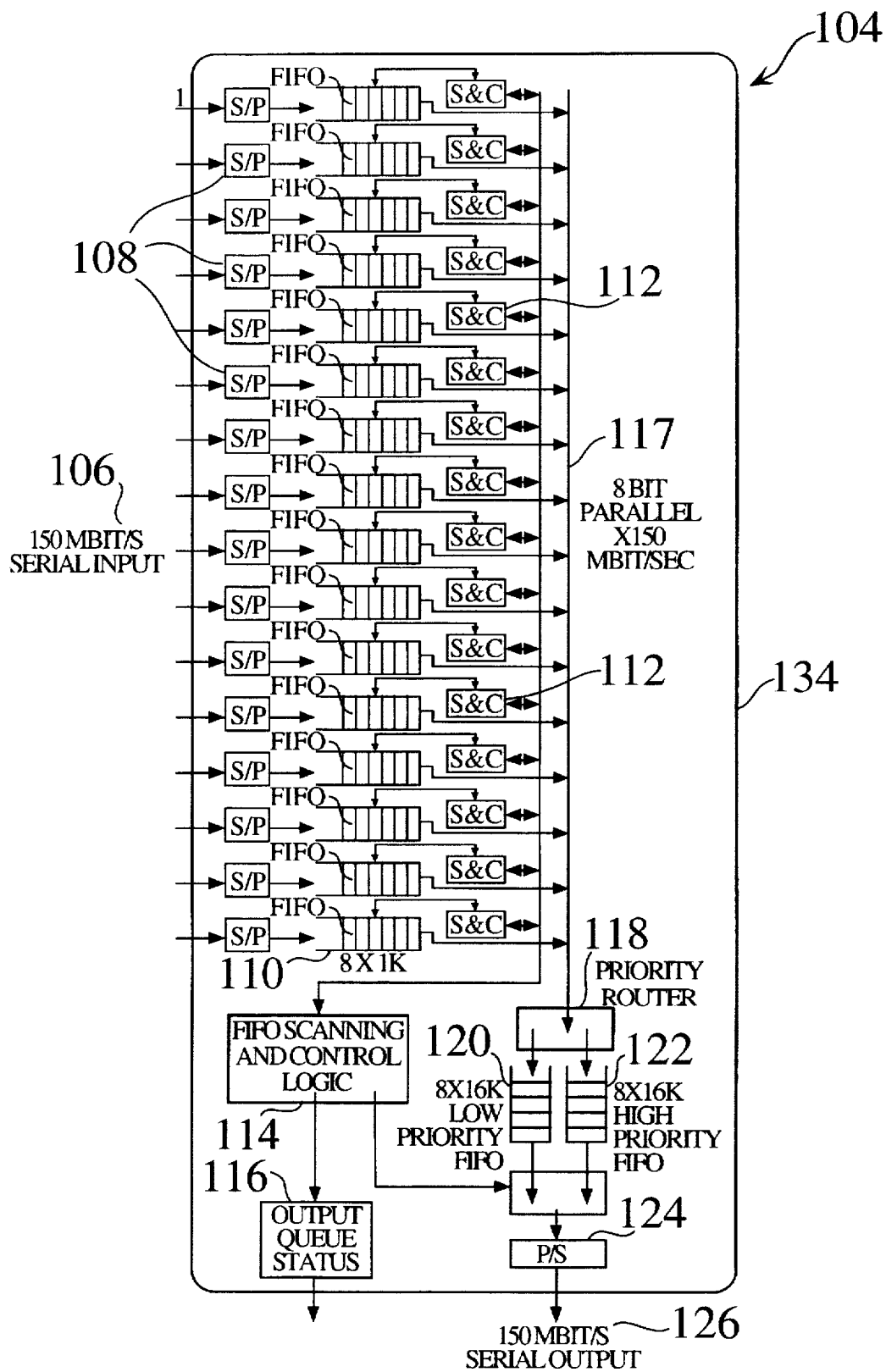

FIG. 5 is a schematic illustration of a 32 by 1 asynchronous packet priority multiplexor.

Figure 6:
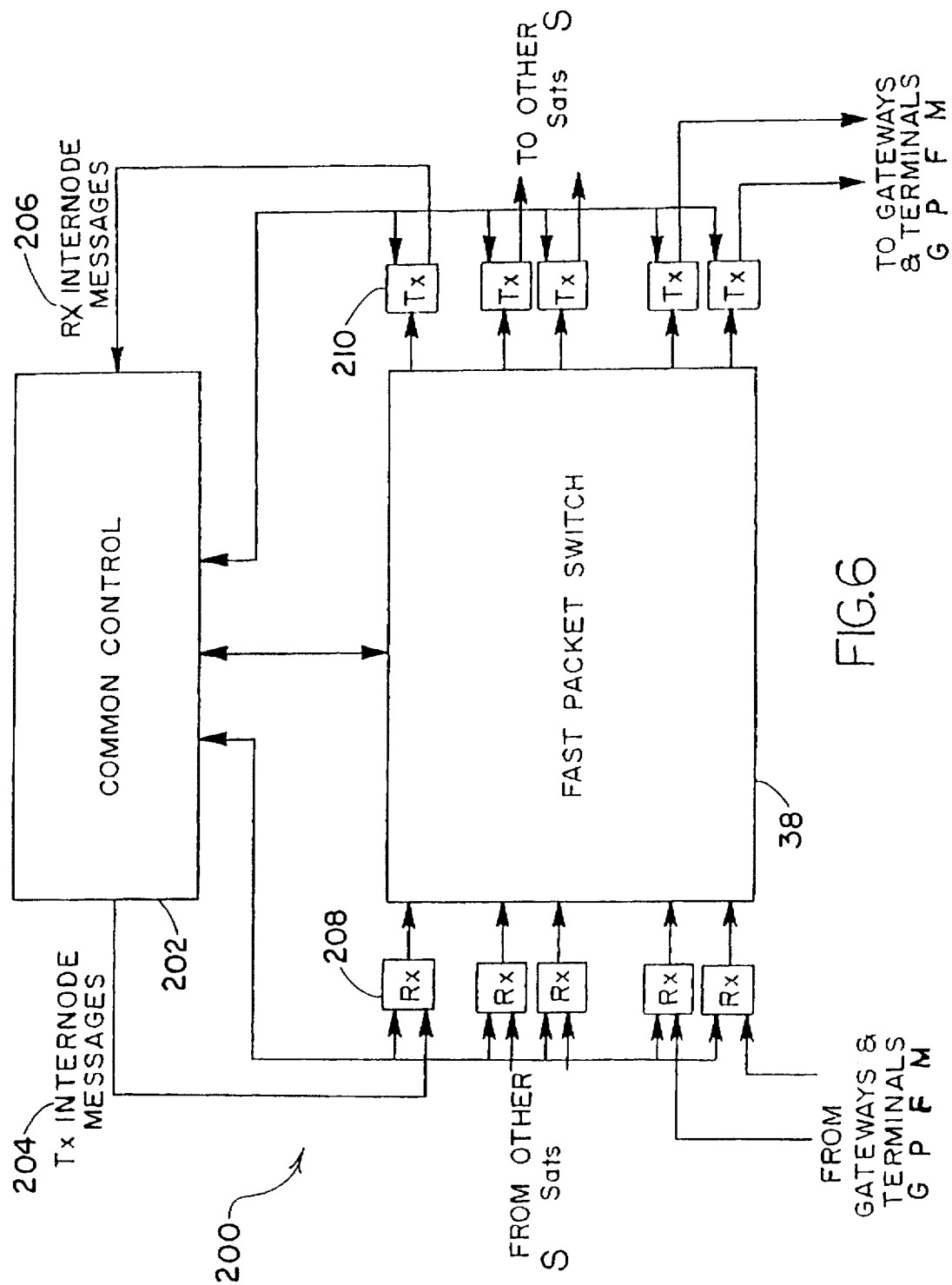

FIG. 6 is a schematic diagram of node hardware architecture.

Figure 7:
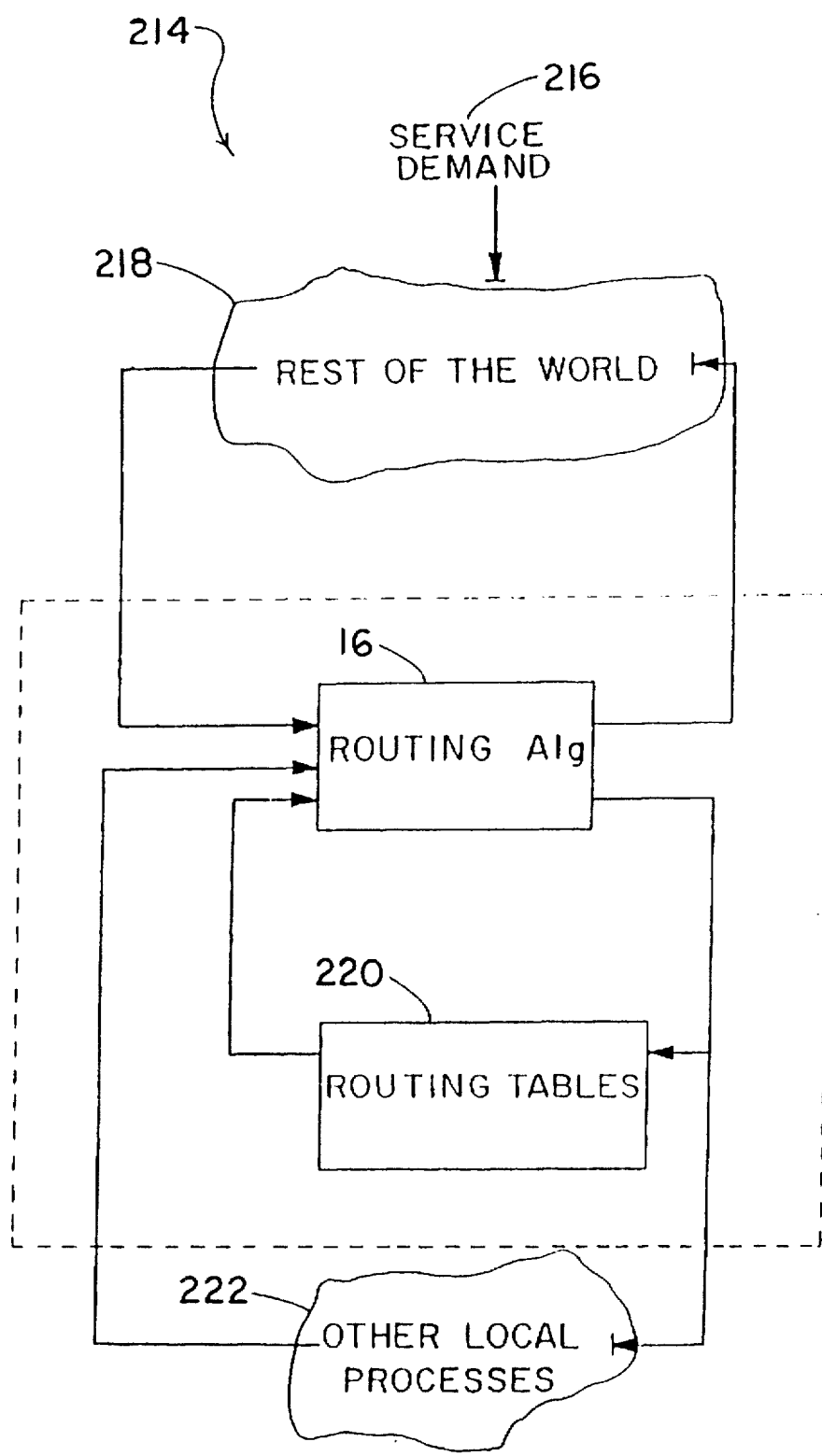

FIG. 7 depicts a routing process.

Figure 8:
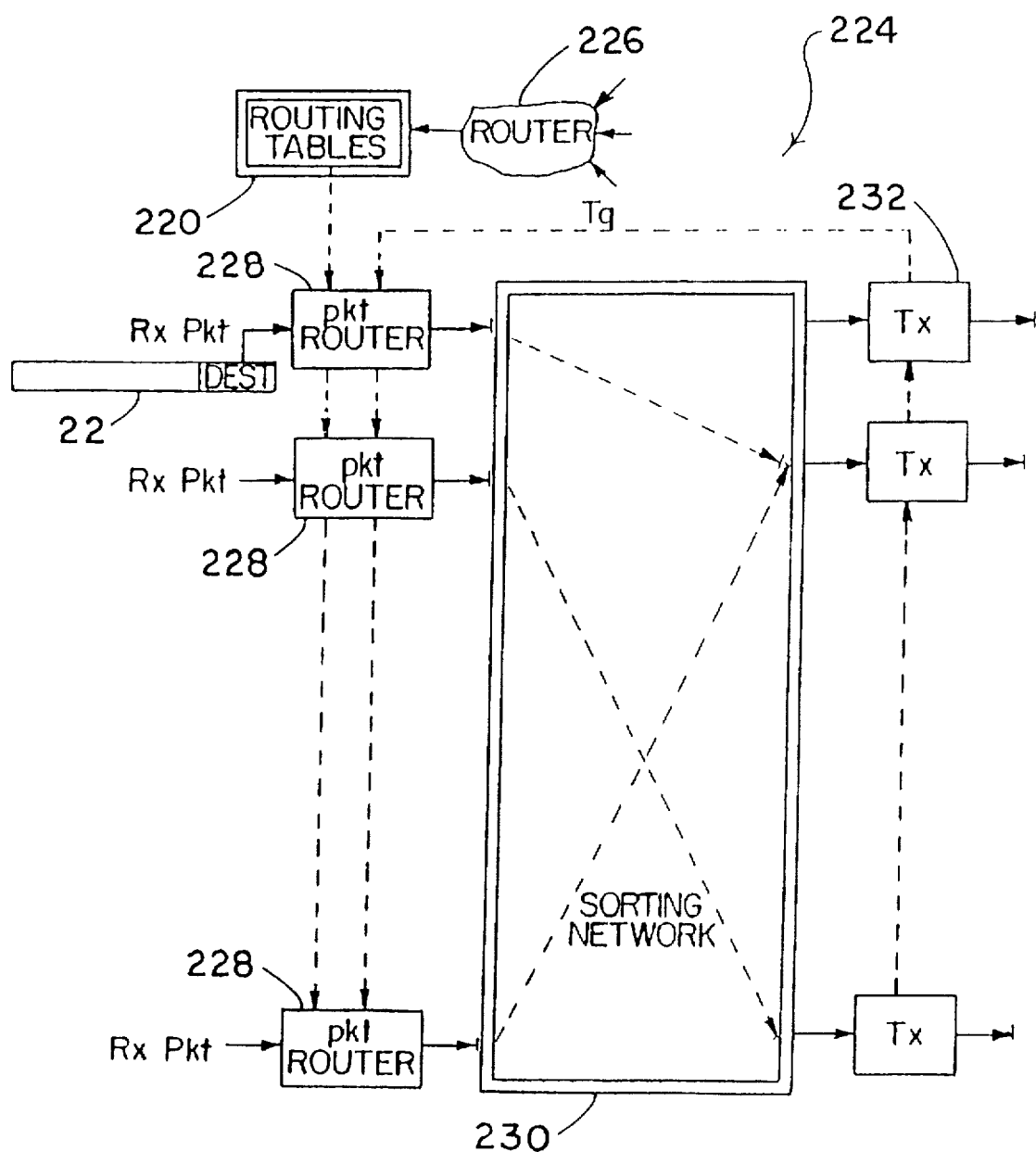

FIG. 8 supplies a flowchart that explains dynamic packet routing.

Figure 9:
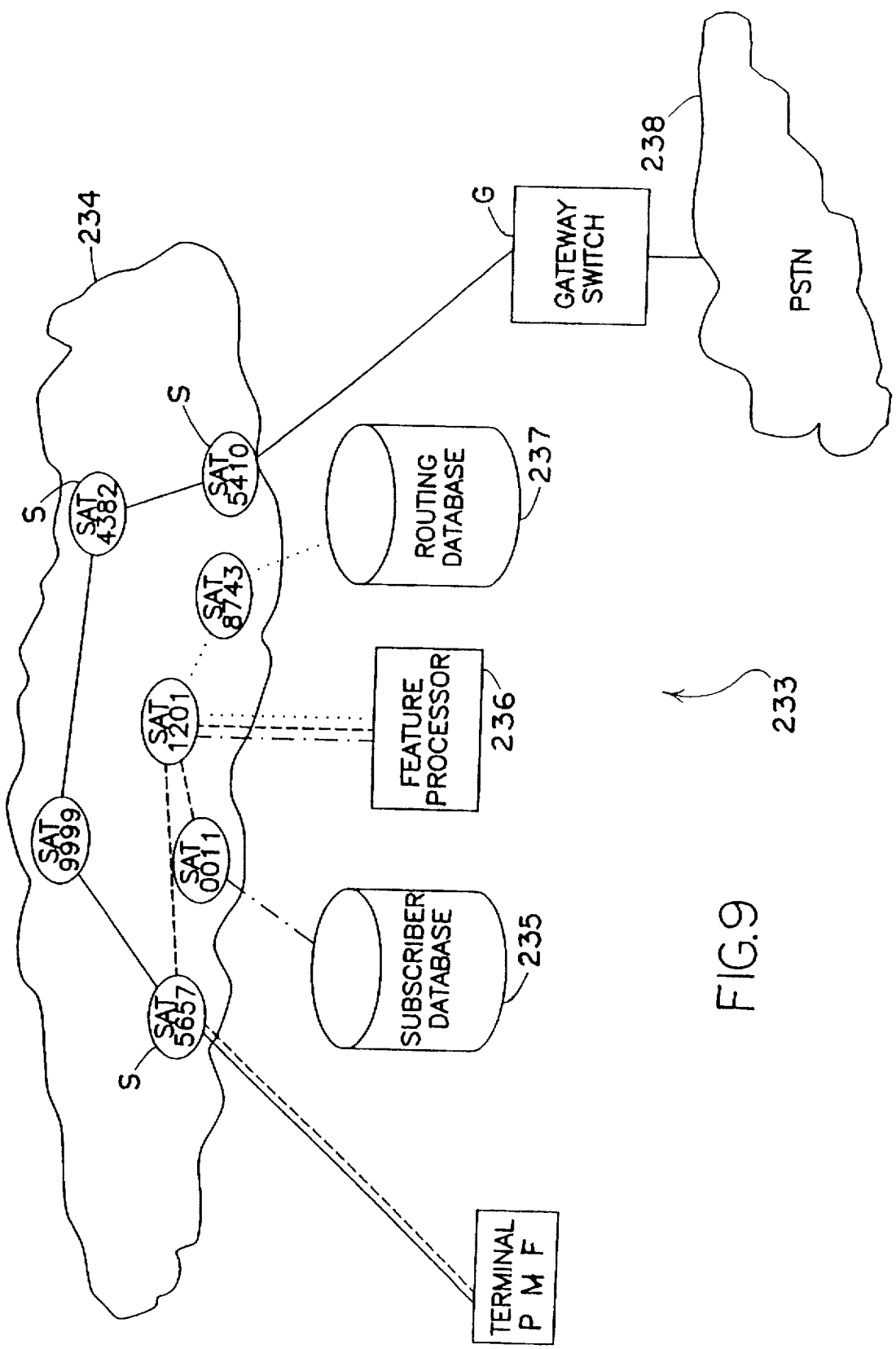

FIG. 9 is a chart which reveals the relationships among terminals, satellites, databases, feature processors, and gateways.

Figure 10:
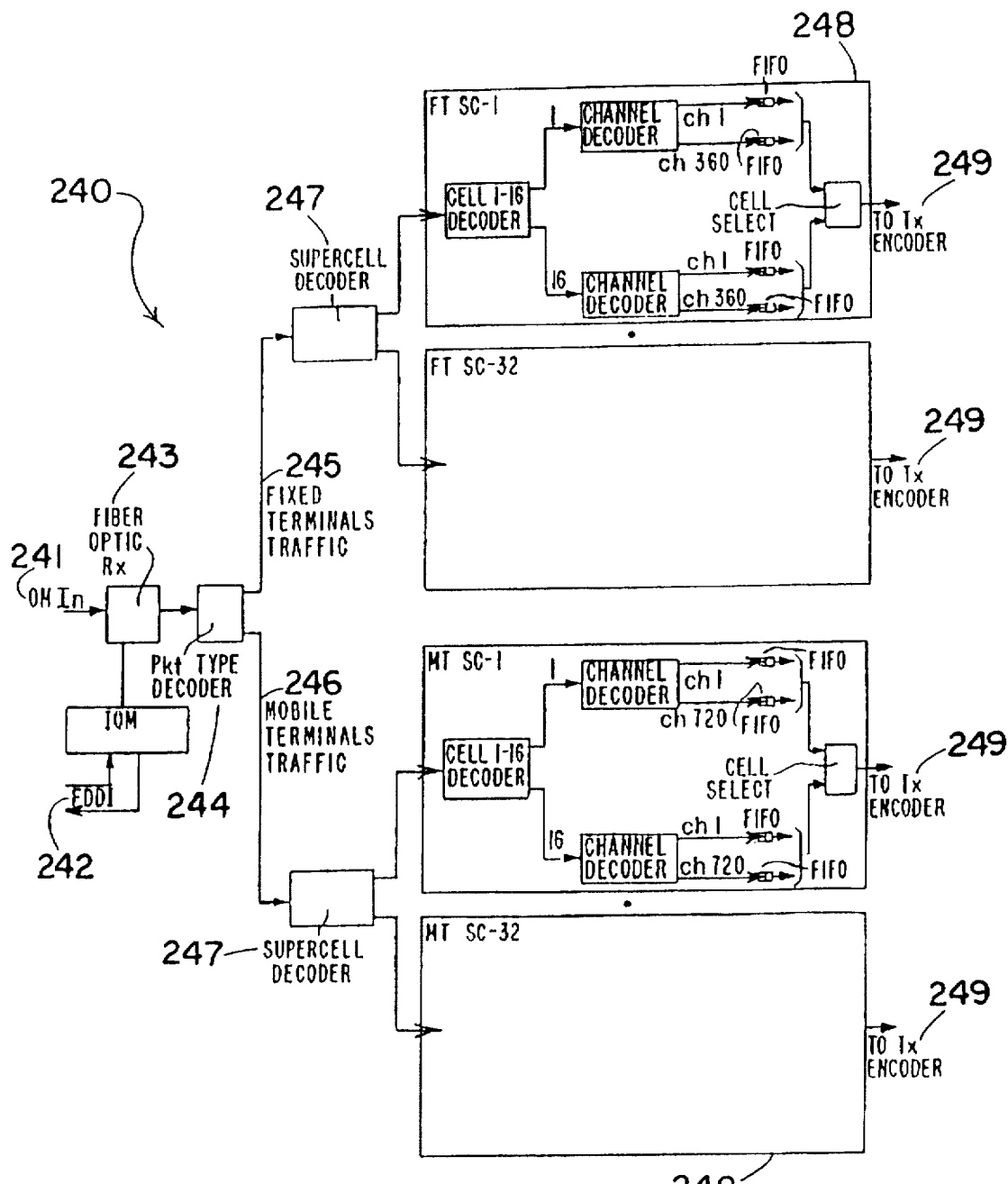

FIG. 10 is a schematic diagram of an output module.

Figure 11:
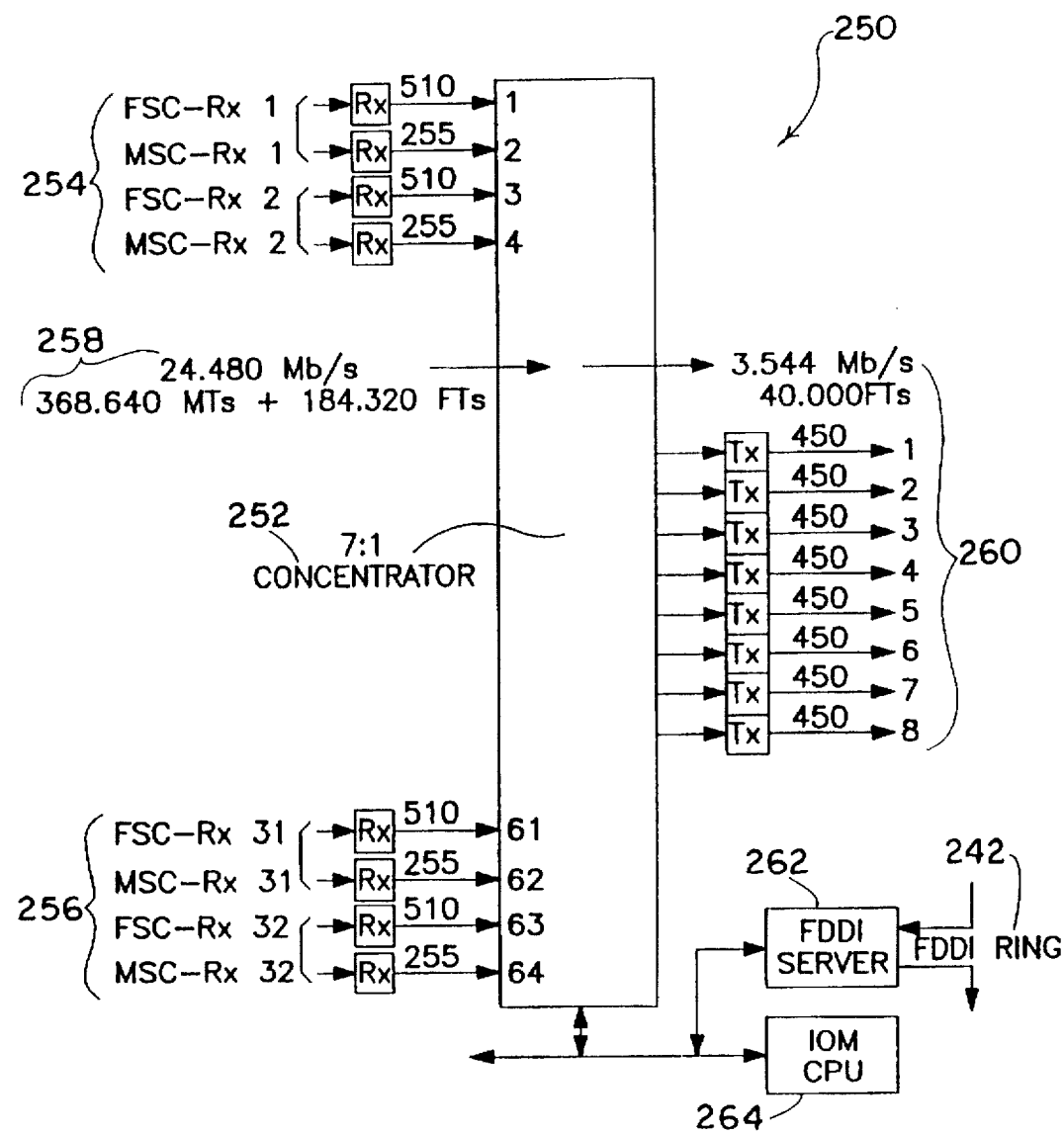

FIG. 11 exhibits the function of a concentrator circuit.

Figure 12:
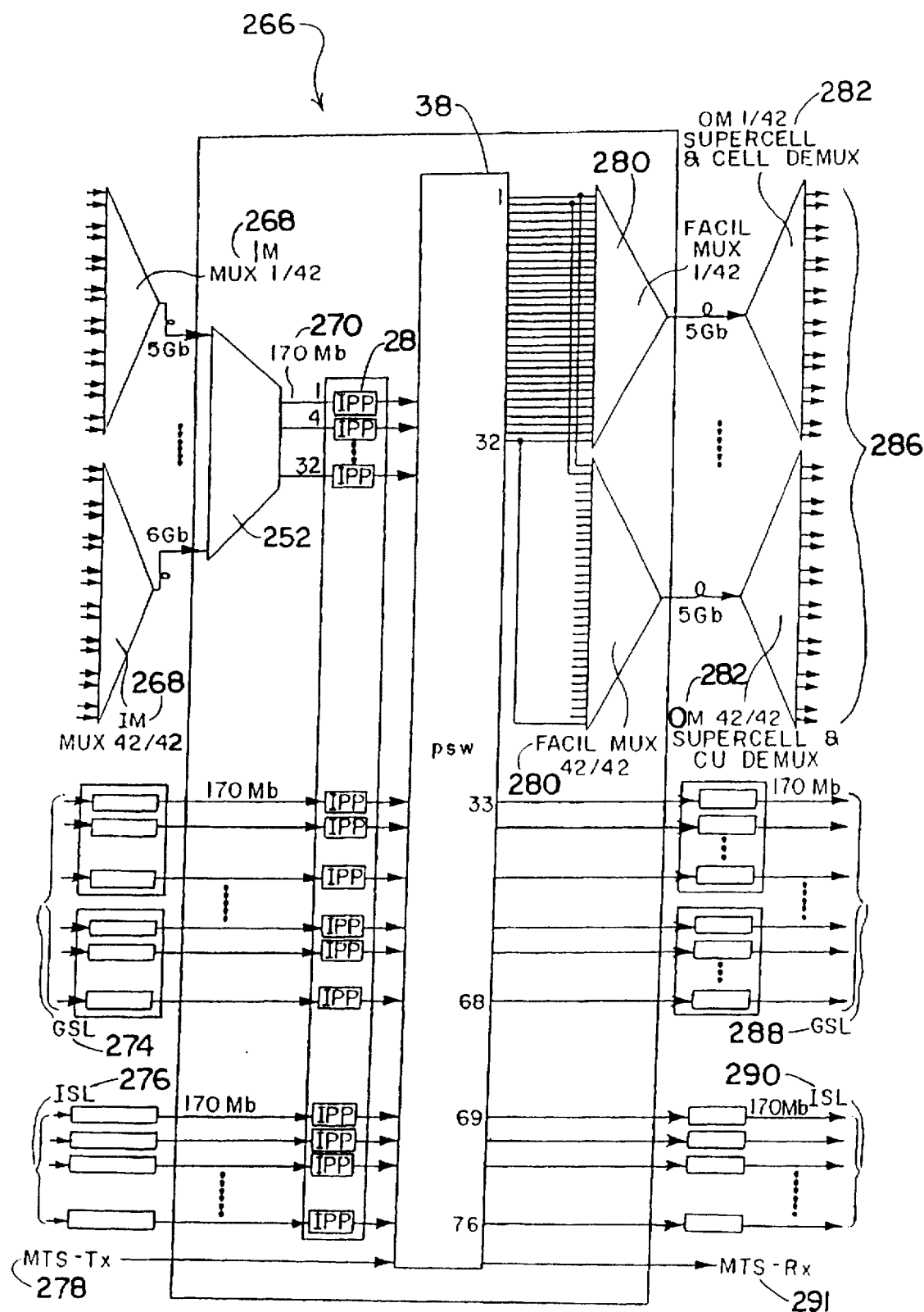

FIG. 12 presents a schematic diagram of switching architecture.

Figure 13:
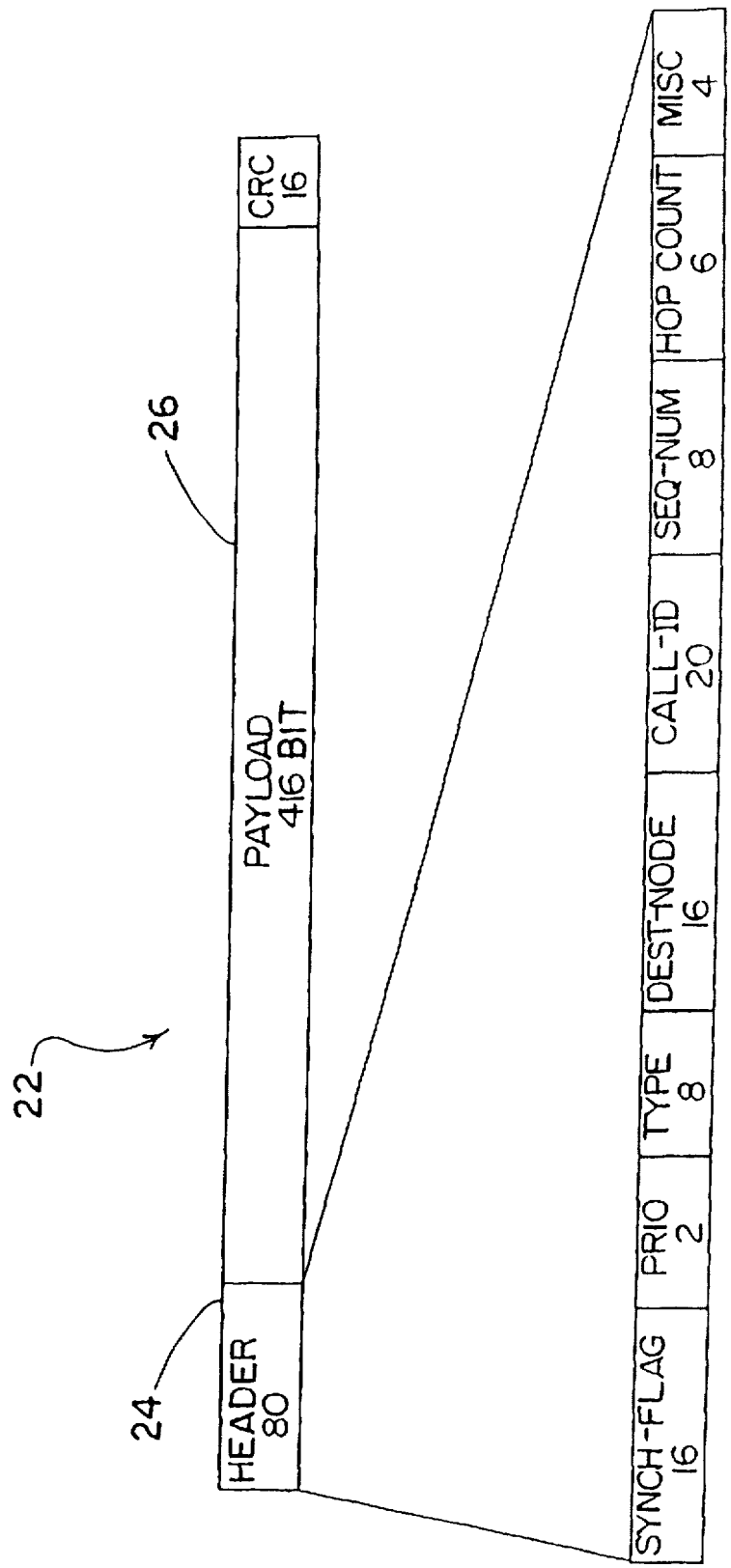

FIG. 13 supplies a schematic diagram of a packet structure.

Figure 14:
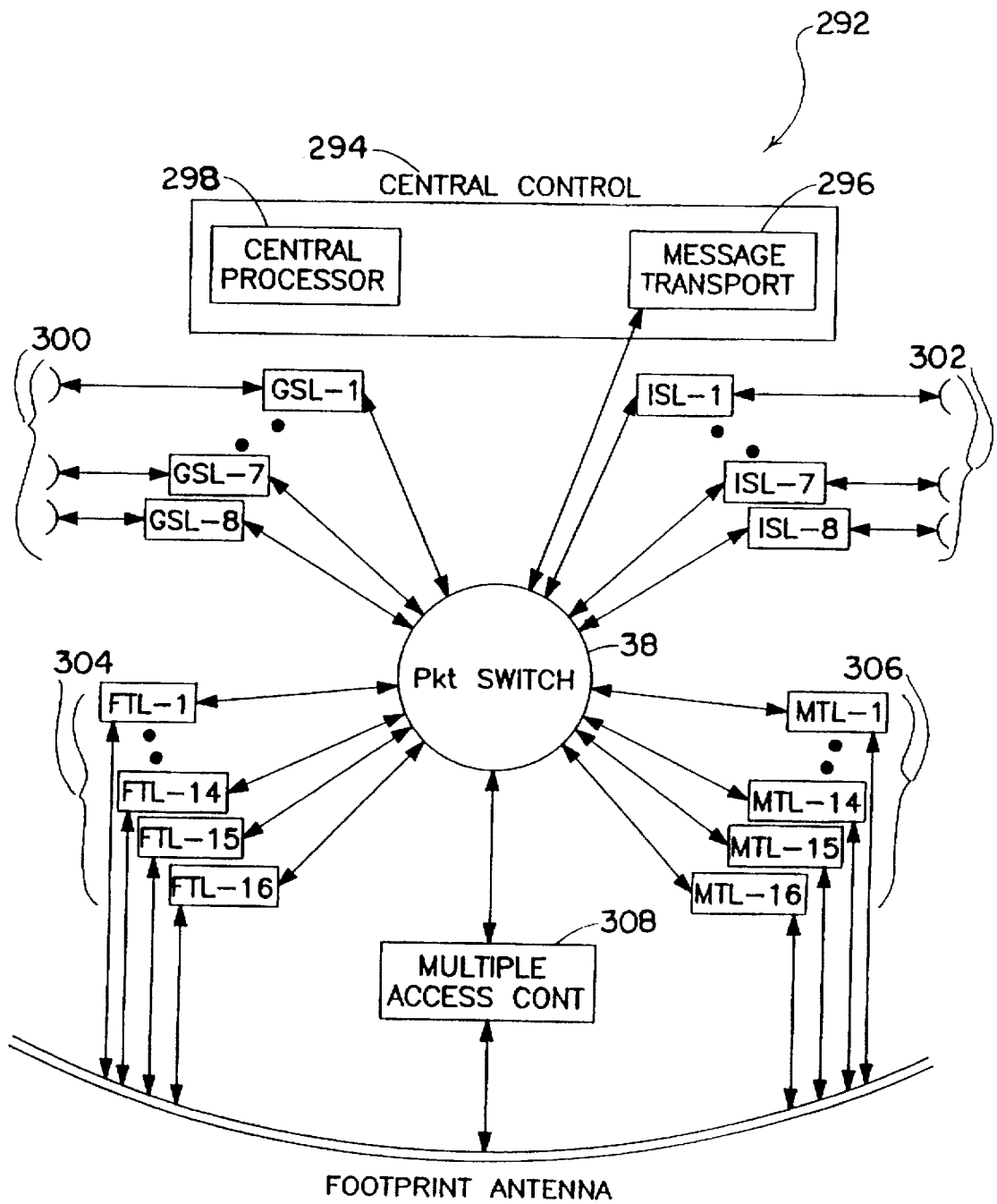

FIG. 14 discloses the lines of communication between the packet switch and its communication links to the world outside each satellite.

Figure 15:
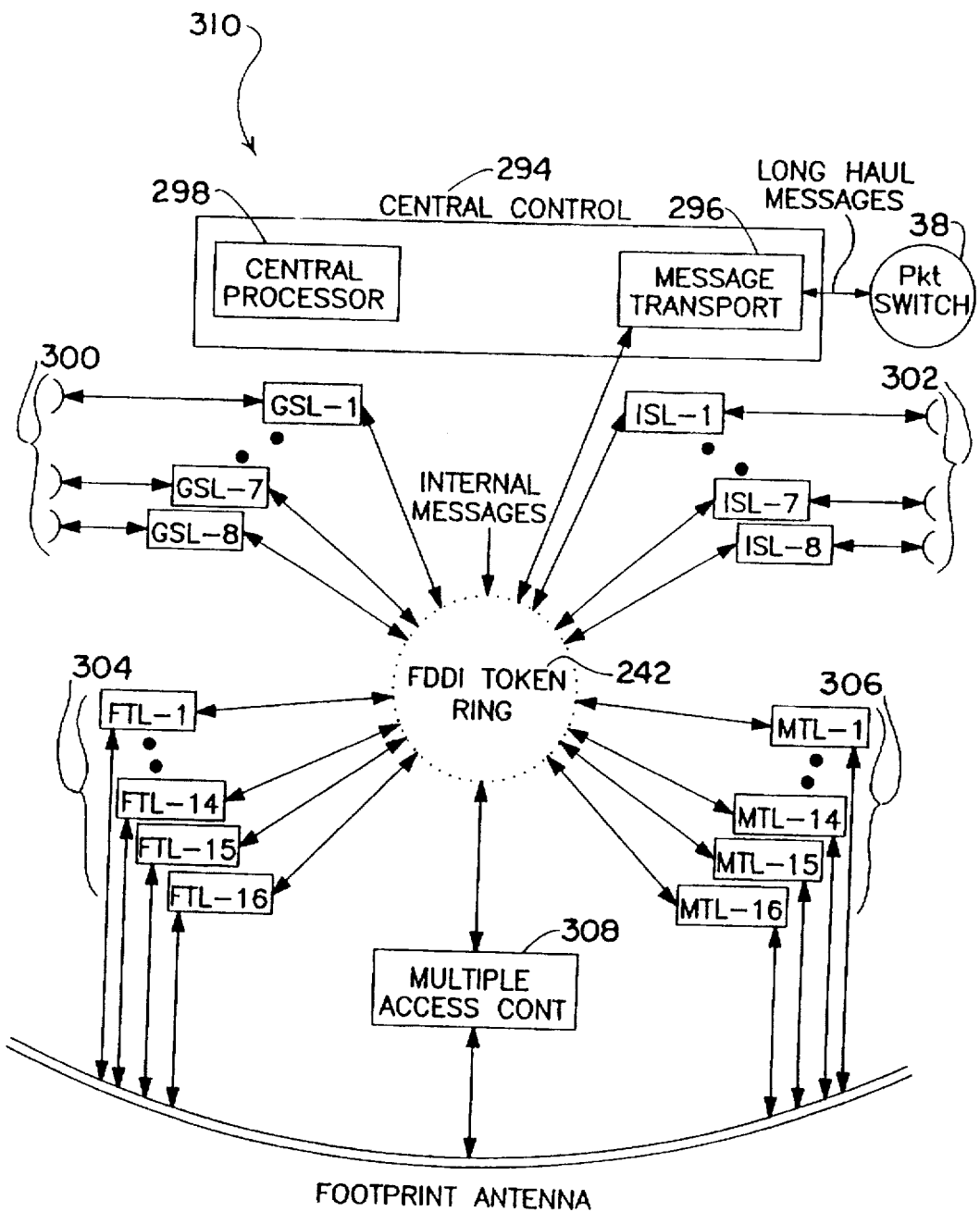

FIG. 15 furnishes a view of internal communications centered on an FDDI token ring.

Figure 16:
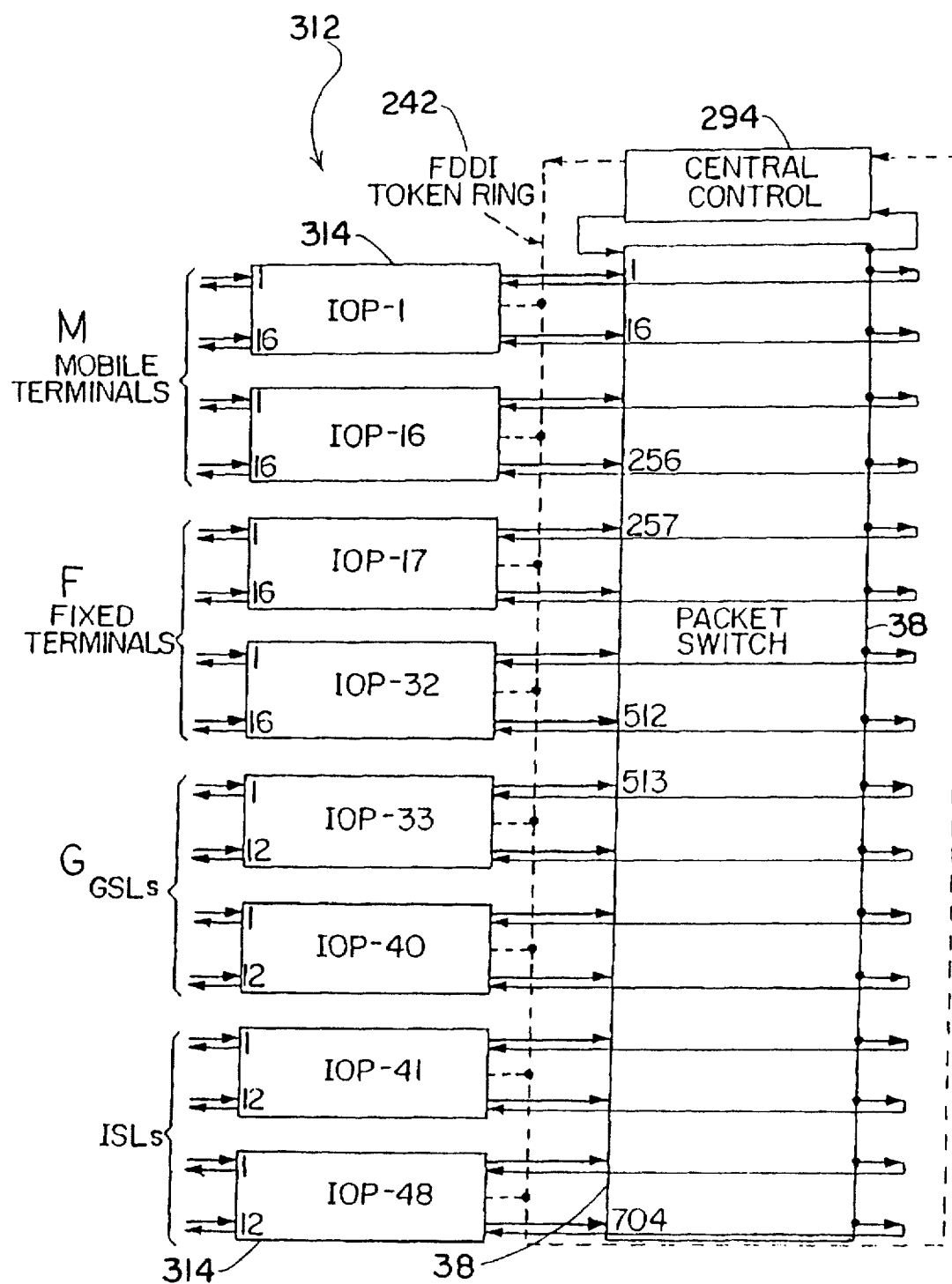

FIG. 16 is a schematic diagram of a packet switch and input output processors coupled together by an FDDI token ring.

Figure 17:
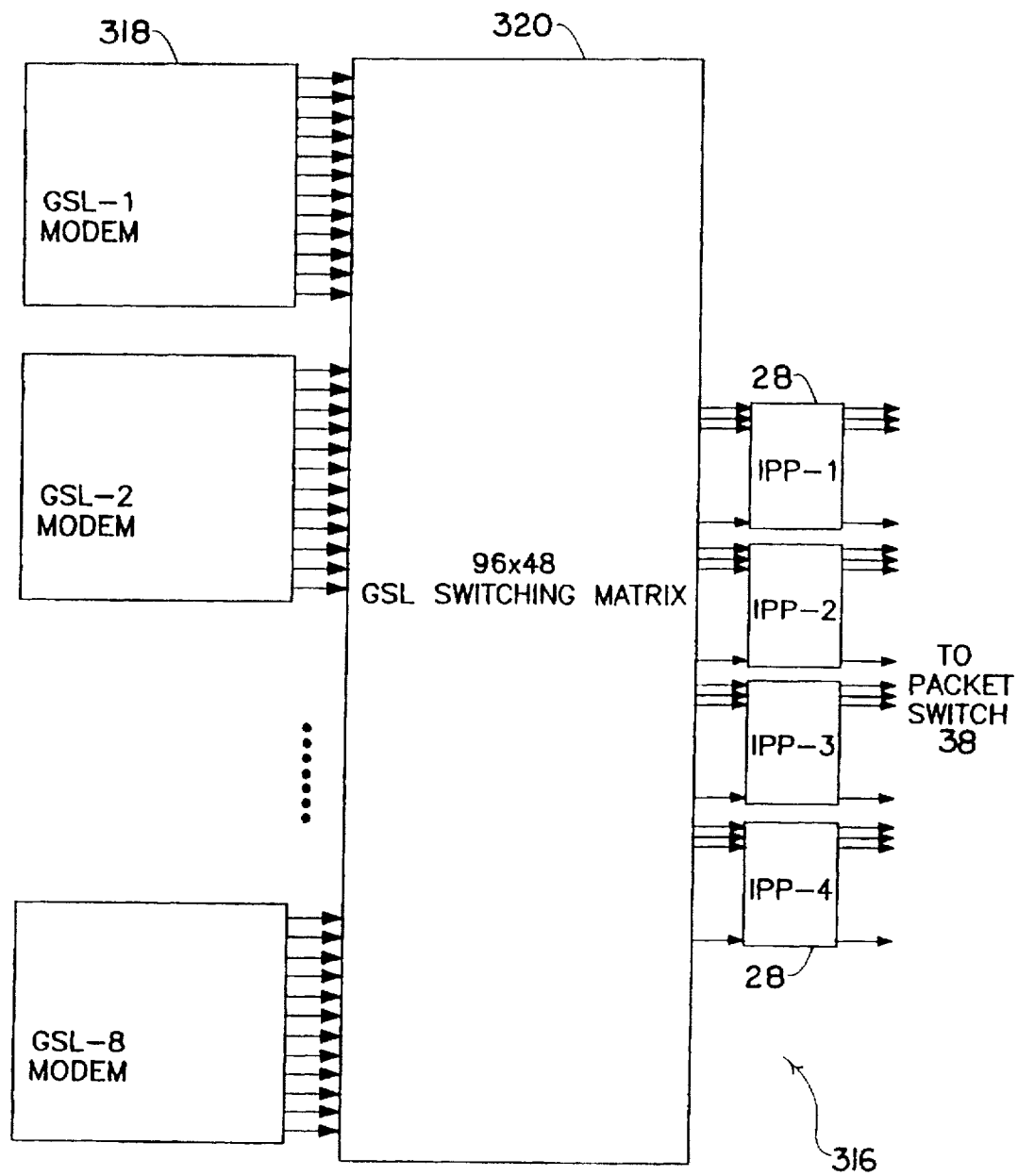

FIG. 17 shows GSL modems and a GSL switching matrix.

Figure 18:
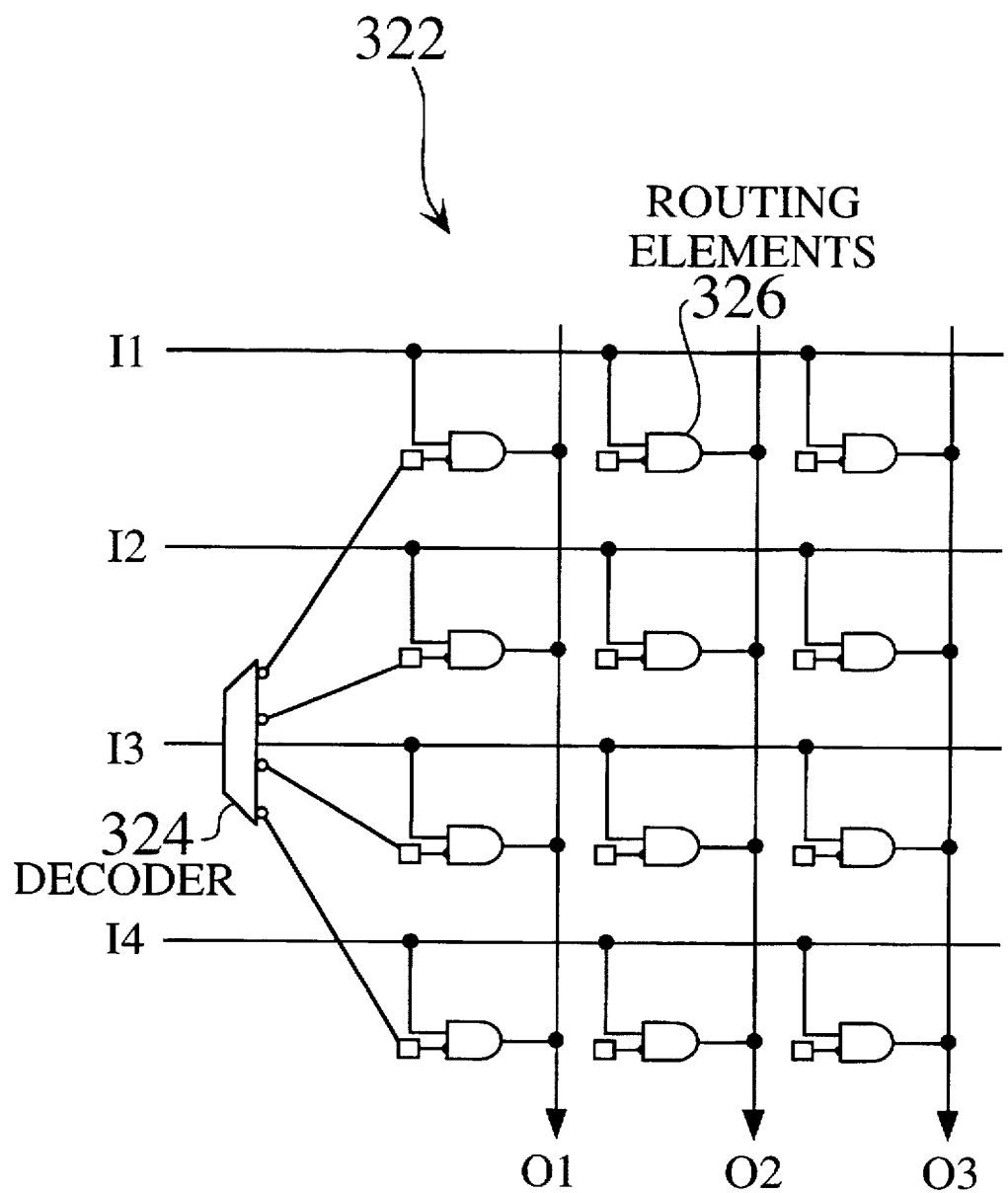

FIG. 18 provides a diagram of switching logic circuitry.

Figure 19:
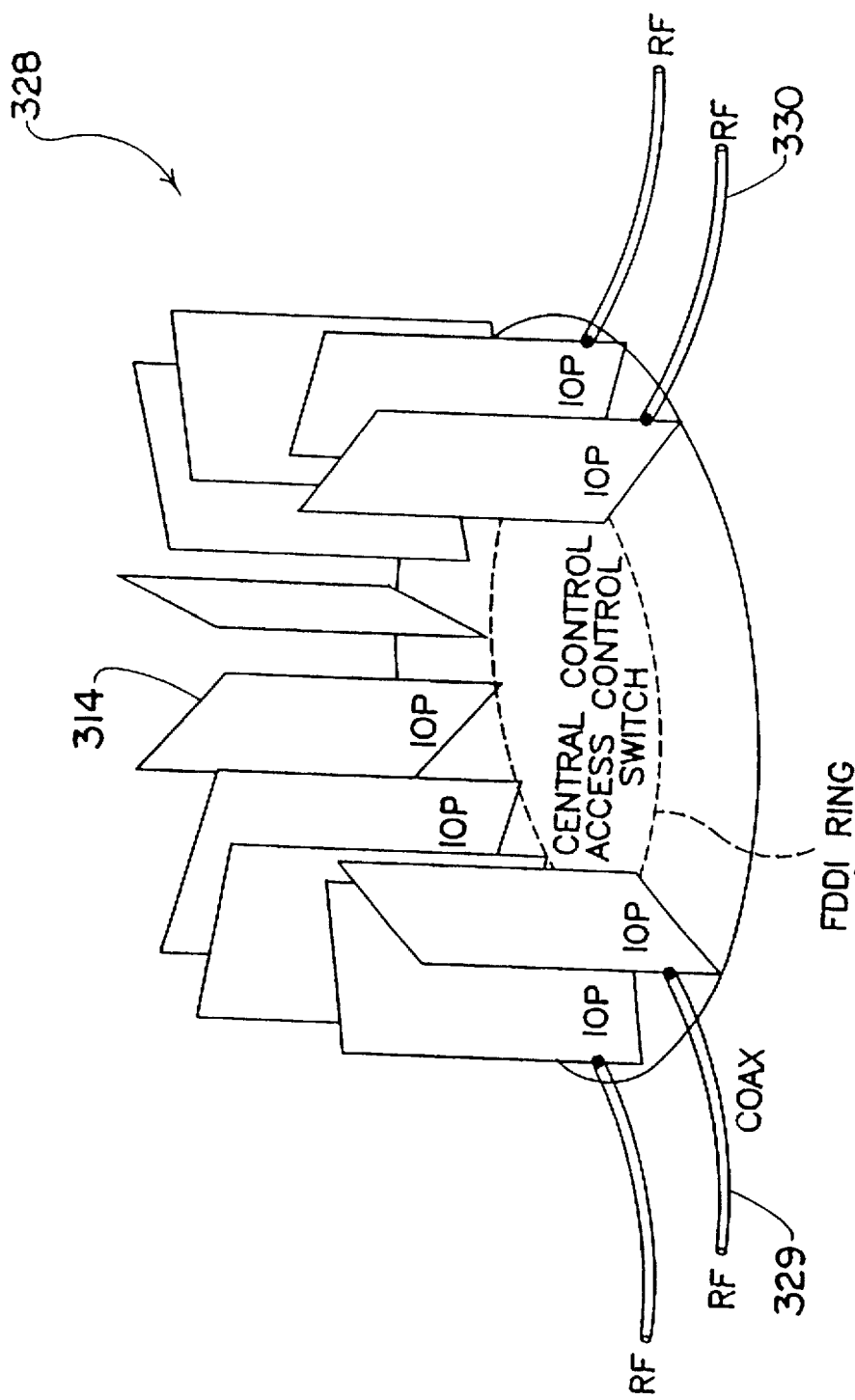

FIG. 19 is a schematic diagram of an FDDI ring and its connections to input output processor (IOP) units.

Figure 20:
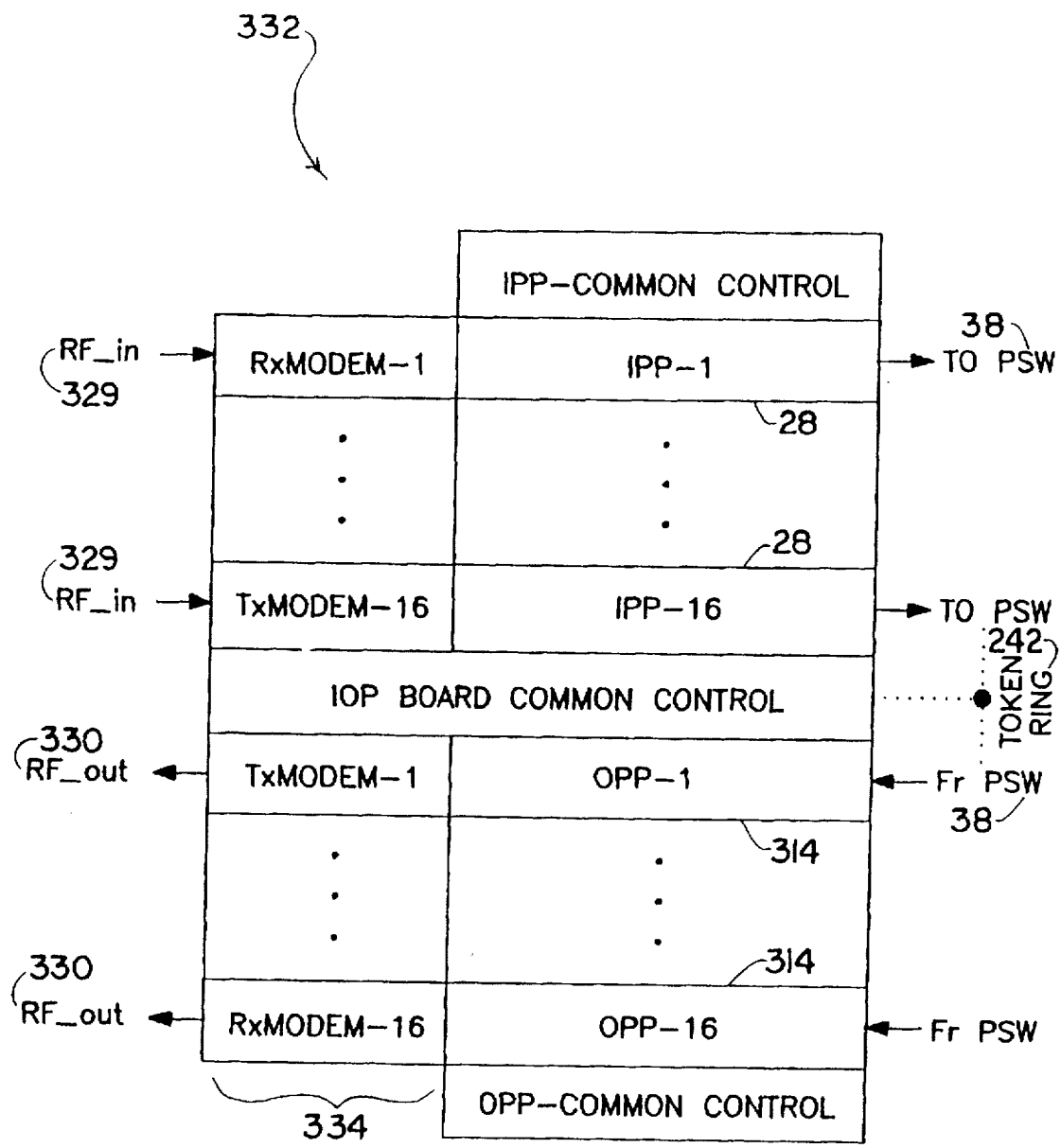

FIG. 20 is a block diagram that illustrates the interface between receive and transmit modems and the fast packet switch.

Figure 21:
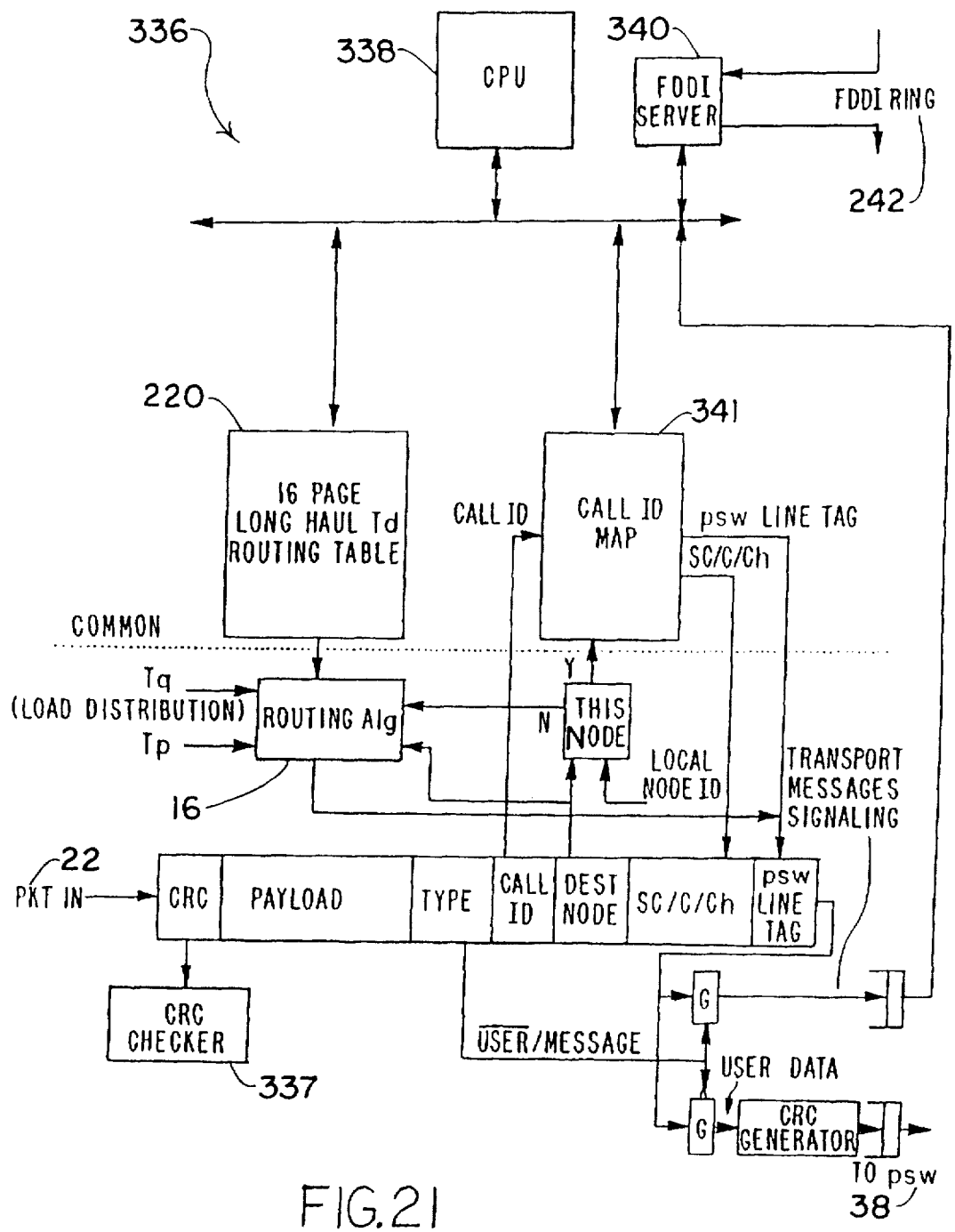

FIG. 21 reveals some aspects of the packet routing process.

Figure 22:
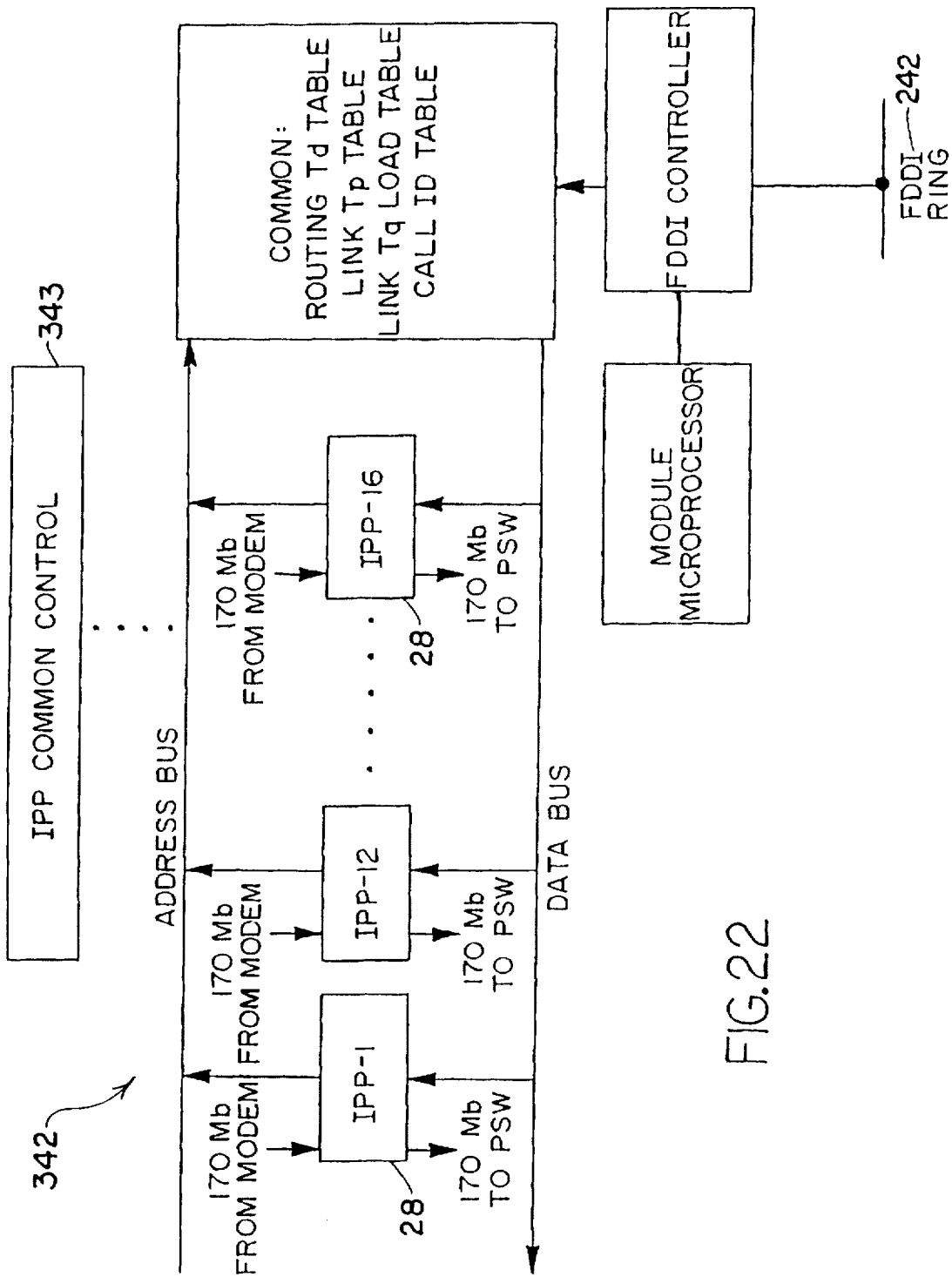

FIG. 22 depicts the arrangement of input packet processors (IPP) and an IPP common control unit.

Figure 23:
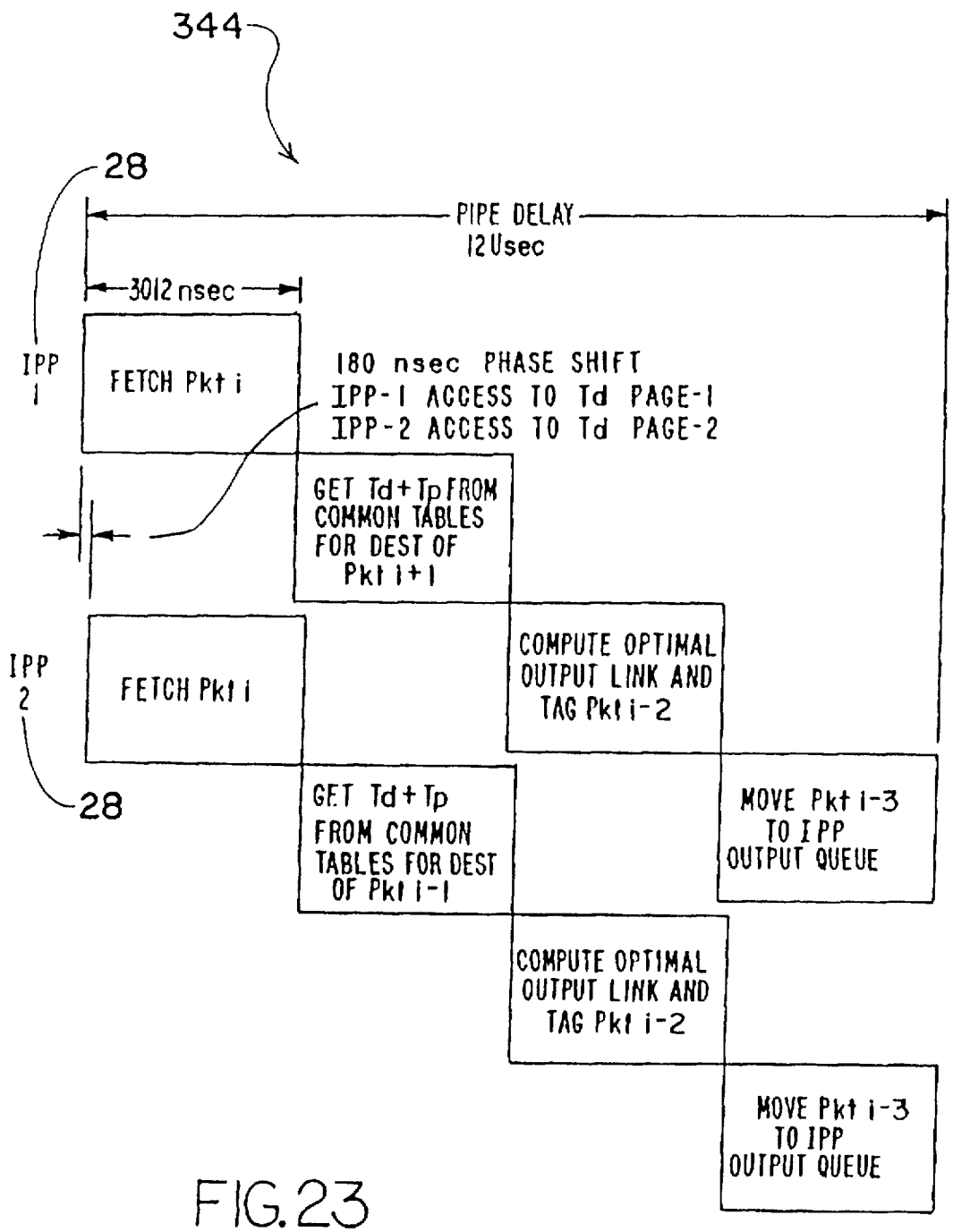

FIG. 23 is a schematic diagram of an IPP 4-stage pipeline.

Figure 24:
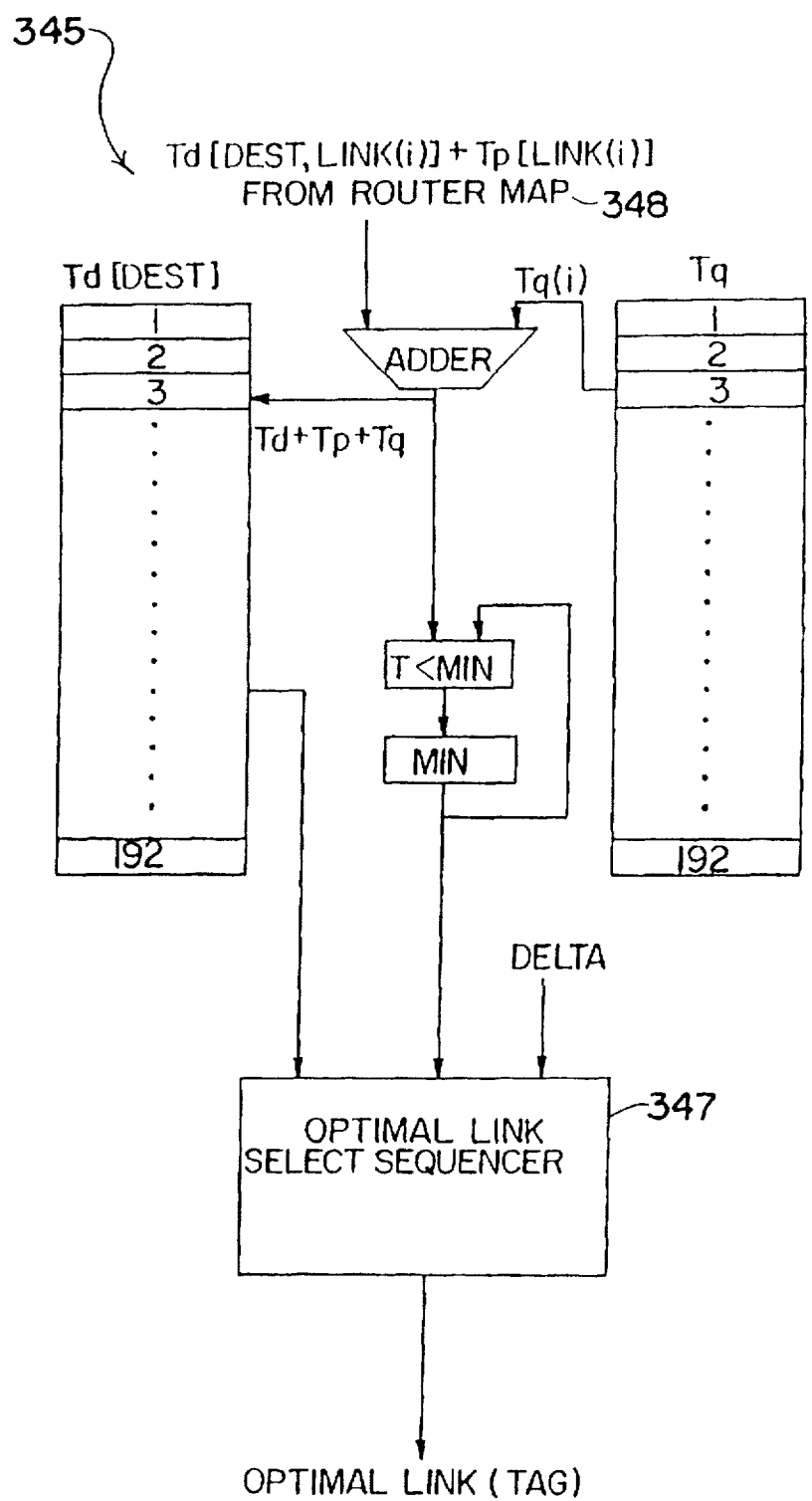

FIG. 24 furnishes an overview of the routing process that generates a set of time delay vectors to produce an optimal link tag for each packet.

Figure 25:
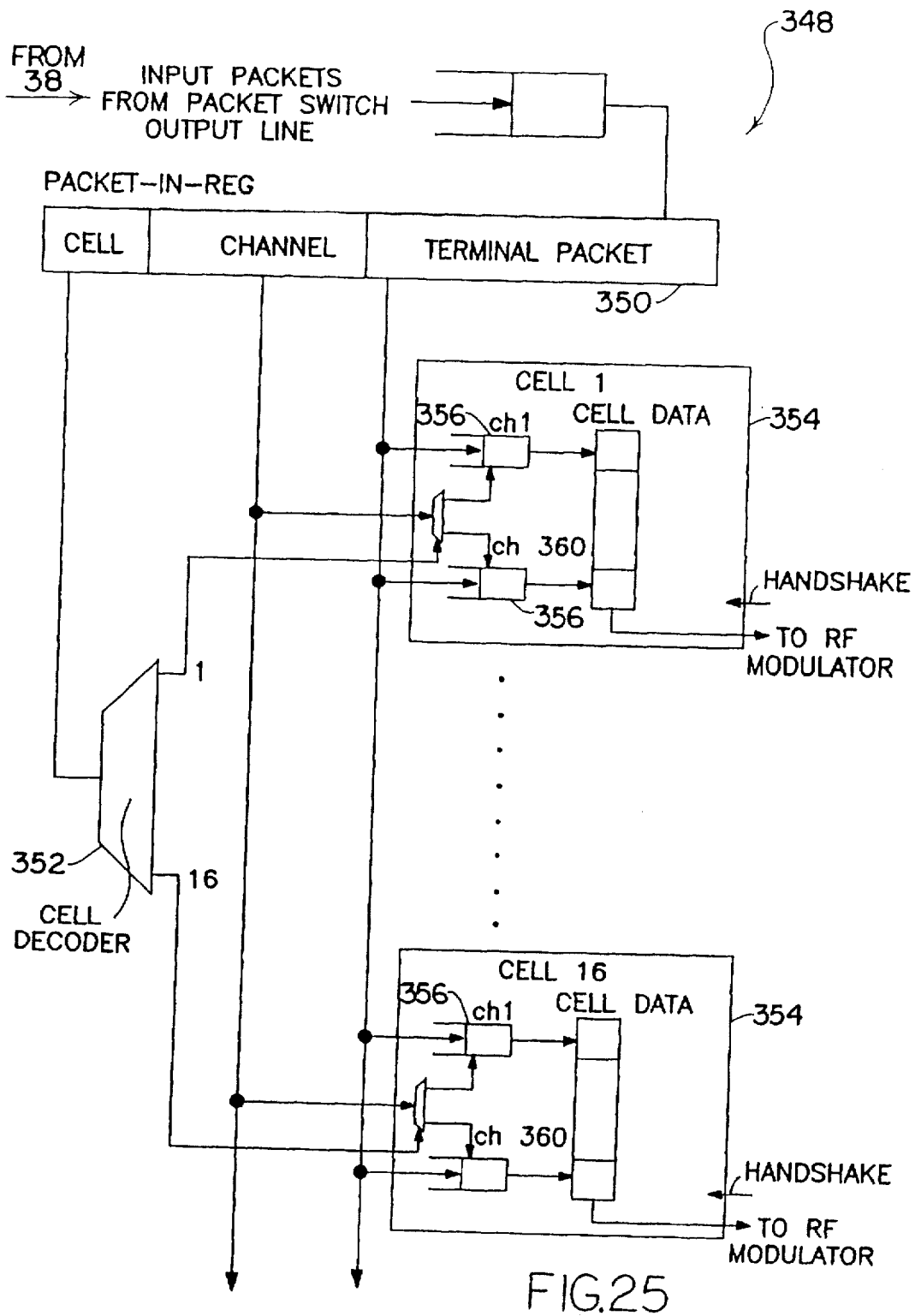

FIG. 25 shows how packets are received from the packet switch and then sorted in cell and channel buffers to await shipment to satellite antennas.

Figure 26:
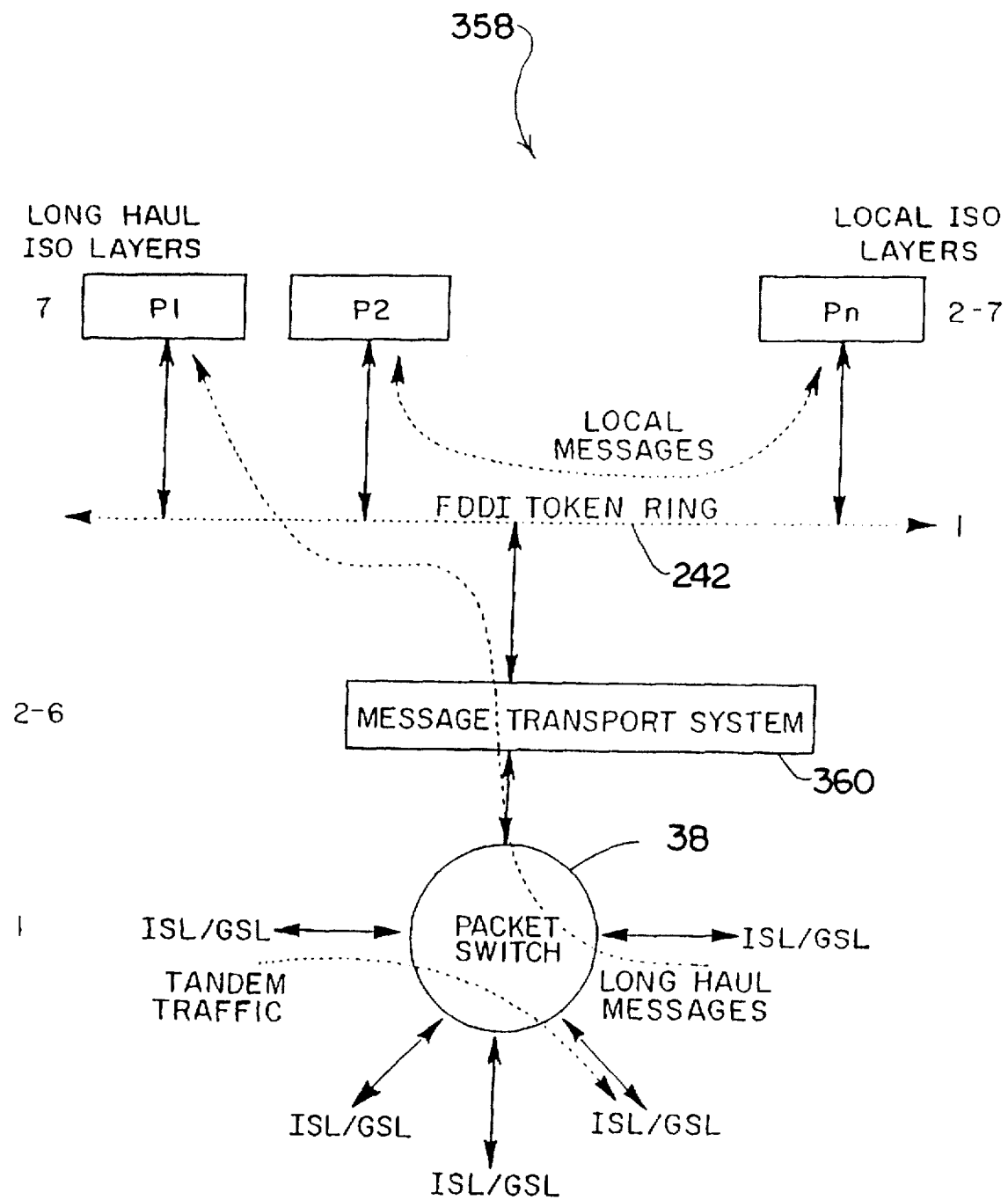

FIG. 26 portrays a message transport system associated with the packet switch.

Figure 27:
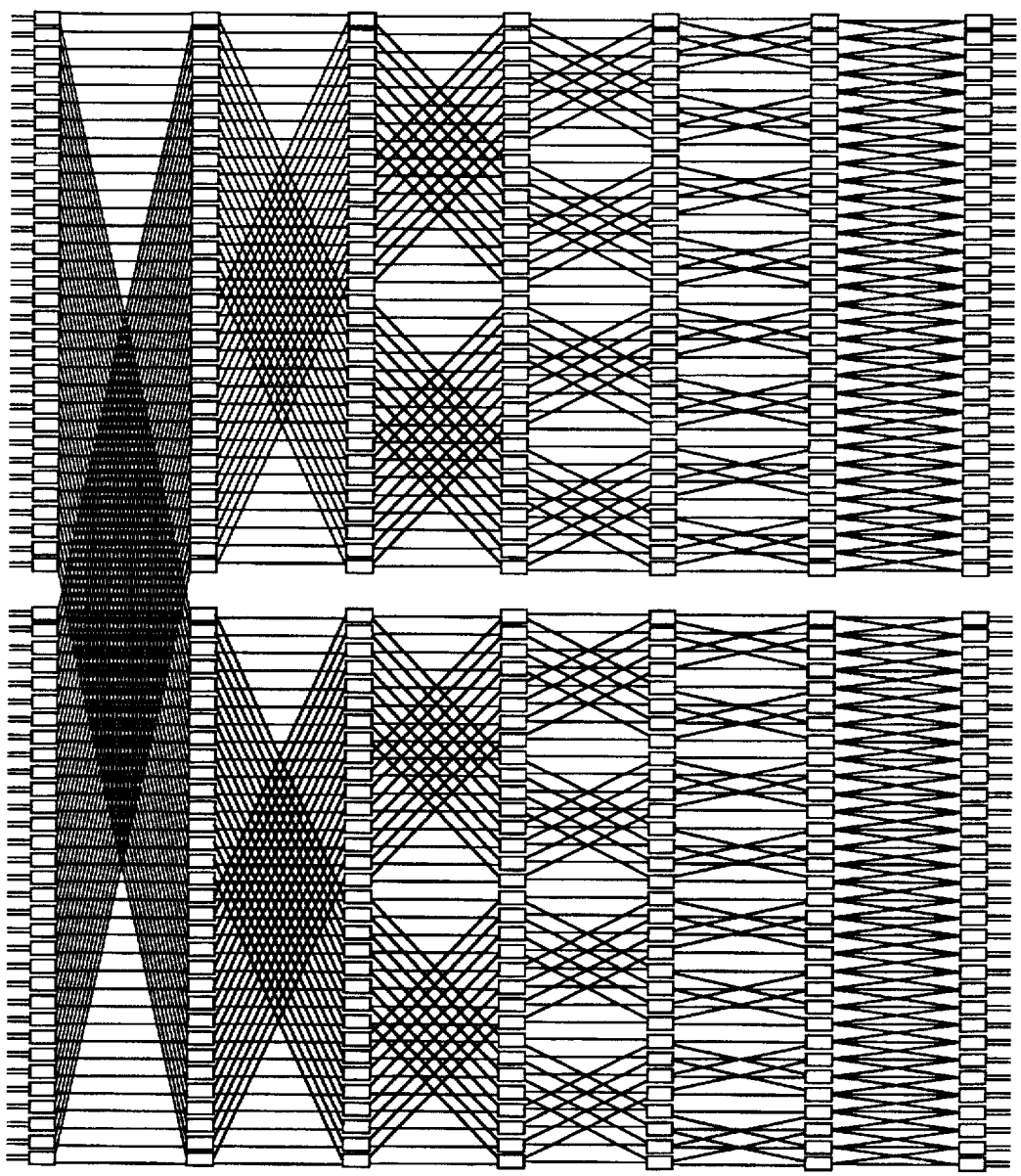

FIG. 27 is a schematic diagram of a 128 by 128 switch.

Figure 28:
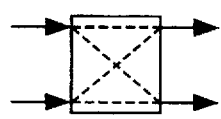

FIG. 28 is a schematic diagram of a single switching cell.

A DETAILED DESCRIPTION OF PREFERRED & ALTERNATIVE EMBODIMENTS

I. System Overview

FIG. 1A is a schematic diagram of a portion of a Satellite Communication System comprising a constellation CON of 840 low Earth orbit satellites S circling the Earth E. In one preferred embodiment, the satellites S are deployed in groups of 40 which each occupy 21 equally spaced orbits OR. The reader is invited to refer to a related, co-pending patent application entitled Satellite Communication System by Edward F. Tuck et al., filed on 28 Feb. 1994 and assigned U.S. Ser. No. 08/203,140 for more details. In the specification, the term "constellation" refers to the satellite S in orbit OR. The constellation is part of the "network", which also includes portable, mobile and fixed terminals P, M, F and gateways G.

FIG. 1B illustrates the interaction of the orbiting satellites S with portable P, mobile M, or fixed terminals F, gateways G or other satellites S. The satellites S communicate with subscribers SUB via radio beams B generated by scanning beam antennas SBA. The satellites S are also capable of conveying signals among each other using intersatellite antennas ISA.

FIG. 1C depicts satellites S in orbit communicating with subscribers SUB in different beam footprints FP formed on the Earth's surface. Each satellite S carries an onboard fast packet switch and microprocessors that furnish sovereign, non-hierarchical and autonomous switching services. FIG. 1C shows radio beams B being directed to subscribers SUB through scanning beam antennas SBA and to other satellites S through intersatellite antennas ISA.

II. Earth-Fixed Supercells & Cells

The present invention is designed to work in combination with inventions described in a copending patent application entitled Earth-Fixed Cell Beam Managementfor Satellite Communication System by David Palmer Patterson and Mark Alan Sturza, filed on 08 Jul. 1993 and assigned U.S. Ser. No. 08/088,714 now U.S. Pat. No. 5,408,237. This related application pertains to methods and apparatus for allocating the radio beams B described above. These beams are precisely controlled so that they illuminate "Earth-fixed cells", as opposed to "satellite-fixed cells." In previous satellite communication schemes, spacecraft which are not held stationary over one particular location on the Earth in geo-synchronous orbits fly over large regions of the Earth very rapidly. The radio beams B generated by these fast moving spacecraft sweep across vast regions of the Earth's surface at the same rate of speed. If these beams were visible to the eye, they would paint bright circular and elliptical patches of light on the ground beneath the satellite which emitted them. In a system that employs satellite-fixed cells, the footprint FP of the radio beams propagated by the spacecraft defines the zone on the ground called a "cell" which is illuminated by the spacecraft. This satellite-fixed cell moves constantly as the spacecraft orbits around the globe.

In sharp contrast, an Earth-fixed cell is a stationary region mapped to an "Earth-fixed grid" that has permanent fixed boundaries, just like a city or a state. Although the rapidly moving satellites still shine their radio beams over the ground in rapidly moving footprints, the locations of the footprints at any given time do not determine the location of the unchanging Earth-fixed cells. The great advantage provided by using cells having boundaries that are fixed with respect to an Earth-fixed grid is realized when a subscriber being served by one satellite must switch to another beam in the same satellite or to a second satellite because the first is moving out of range below the local horizon. With satellite-fixed cells, this "hand-off" involves the assignment to the terminal of a new communication channel within the new beam or new satellite.

This assignment process takes time and consumes processing capacity at both the terminal and the satellite. It is also subject to blocking, call interruption, and call dropping if there is not an idle communication channel in the next serving beam or satellite. The Earth-fixed cell method avoids these problems by allocating communication channels (frequency, code, and/or time slot) on an Earth-fixed cell basis rather than on a satellite-fixed cell basis. Regardless of which satellite/beam is currently serving a particular cell, the terminal maintains the same channel assignment, thus substantially eliminating the hand-off problem.

The Earth's surface is initially mapped into an unchanging Earth-fixed grid EFG which each satellite can accurately locate from its position data. Each satellite is capable of steering, transmitting and receiving beams conveying packets of information to the Earth-fixed grid EFG. The beams are continually adjusted to compensate the effects of satellite motion, attitude changes, and the rotation of the Earth.

For a satellite in low Earth orbit, the satellite footprint sweeps over the Earth's surface at approximately 25,000 Km/hr. If the cell pattern of the present invention moved with the satellite footprint, a terminal would remain in one cell for only a few seconds before a channel reassignment or hand-off to the next cell is required. As is the case with terrestrial cellular systems, frequent hand-offs result in inefficient channel utilization, high processing costs, and lower system capacity.

FIG. 1F is a diagram that reveals the incidence of radio beams B from a satellite S that form a footprint FP over California. FIG. 1F also shows an Earth-fixed grid EFG that is mapped to the surface of the Earth. This grid is divided into supercells 21A and cells 21B. FIG. 1G depicts the relationships among the Earth-fixed grid EFG, a supercell 21A and the nine cells 21B within the supercell 21A. Each supercell 21A is a square three by three matrix comprising nine square cells 21B. In the preferred embodiment, this Earth-fixed grid comprises approximately 20,000 supercells 21A. Each supercell is a square 160 km on each side, while each cell 21B is a square measuring 53.3 km on each side.

The supercells 21A are arranged in bands that are parallel to the Equator. There are approximately 250 supercells 21A in the band at the Equator, and the number per band decreases in proportion to the cosine of the latitude of their location on the globe. Because the number of supercells per band is not constant, the "North-South" supercell borders in adjacent bands are not aligned. A fixed algorithmic relation defines the mapping between supercell coordinates and latitude-longitude coordinates. A "time-of-day" relation defines which orbital plane has primary coverage responsibility for each supercell 21A, and the satellites' orbital position completes the "Earth-coordinates-to-serving-satellite" relation. This relation makes it possible to determine at any time which satellite has primary coverage responsibility for a terminal based on the terminal location.

The relatively small fixed cells of the preferred embodiment also provide a means to contour service areas to country boundaries, which is impossible to do with large moving satellite-fixed cells. The Earth-fixed cells method utilizes a cell database which defines the type of service allowed within each cell, and can be used to turn off service on a country-by-country basis, or to avoid interference with radio astronomy or other specific sites.

Each footprint FP encompasses a maximum of 64 supercells 21A, or 576 cells 21B. The actual number of cells 21B for which a satellite is responsible is a variable that depends on satellite location and spacing between satellites. As a satellite passes over, it steers its antenna beams to the fixed cell locations within its footprint. This beam steering compensates for the satellite's motion as well as for the Earth's rotation. As an analogous example, the beam steering method employed by each satellite to track a cell as the satellite flies overhead is similar to the motion of the tread of a bulldozer over the ground. Each spot on the tread remains in contact with a single point on the ground while the bulldozer moves along. Frequencies and time slots are associated with each cell and are managed by the current "serving" satellite. As long as a terminal remains within the cell, it maintains the same channel assignment for the duration of a call, regardless of how many satellites and beams are involved. Channel reassignments become the exception rather than the normal case, thus eliminating much of the frequency coordination and hand-off overhead.

The high minimum mask angle of 15 degrees employed in one of the embodiments of the invention results in a small satellite footprint and the large number of satellites in the constellation. Another embodiment of the invention employs an even higher mask angle of 40 degrees. For the case of the 40 degree mask angle, the peak density is 0.5 of the simultaneous basic rate channels/$Km^2$ averaged over a cell. For the case of a 40 degree mask angle and a 53.3 Km-square cell, 1,440 channels are employed which would serve over 14,000 typical business subscribers.

Each satellite footprint FP comprises a collection of contiguous cells 21B, and is somewhat analogous to a terrestrial cellular system. Each cell 21B supports a number of communication channels. Terminals within the cell 21B share these channels using a combination of multiple-access methods that are described in more detail below. Cells are arranged in a pattern which allows frequencies and time slots to be reused many times within a satellite footprint FP without interference between adjacent cells 21B. The high gain satellite antennas that will be employed by the preferred embodiment produce small cells (53.3 Km on each side) which result in extremely efficient use of spectrum, high channel density and low power requirements.

III. The Switching Process

FIGS. 1D and 1E are flowcharts that show the generalized operation of the preferred embodiment of the present invention. FIG. 1D illustrates an autonomous, sovereign, and non-hierarchical switching process 10 as it occurs on each satellite S in the orbiting constellation CON. Signals are conveyed to each satellite over beams B that are received by either scanning beam antennas SBA or intersatellite link antennas ISA. Each satellite S carries an autonomous orbit determination (AOD) microprocessor 11A which runs autonomous orbit determination software 11B. The preferred embodiment of the code listing for the autonomous orbit determination software 11B is presented in Part A of the Microfiche Appendix which was submitted to the U.S. Patent Office as part of this specification. The AOD microprocessor 11A continuously computes ephemeris parameters for each satellite S. These parameters are broadcast to every satellite S in the constellation CON, so that all the spacecraft "know" their own positions and the position of every other satellite S in the network.

The AOD microprocessor 11A produces orbital position information 11C which is supplied to an adaptive routing (AR) microprocessor 12A. The AR microprocessor 12A constantly monitors the changing locations of all the spacecraft S in the constellation, and also keeps track of communications traffic congestion among the links and nodes of the system. The code listing for the adaptive routing software 12B is presented in Part B of the Microfiche Appendix which was submitted to the U.S. Patent Office as part of this specification.

Each satellite S and gateway G in the network is treated as a "node", and every transmission path between any two "nodes" is treated as a "link". Transmissions between nodes to terminals also occur over a link.

The adaptive routing microprocessor 12A continuously produces an output 12C called "Next-node-in-path-to-destination". This output 12C is written to a routing cache memory 20 through the memory's write port 16. As the name implies, this output 12C contains information for moving communications data through the network via the links which offer the least delays to its destination. The routing cache memory 20 also has an access port 18. An input packet processor 28 reads the contents of the routing cache memory 20 through port 18. Specifically, the input packet processor 28 reads a fast packet switch output port tag 30 through access port 18 and supplies the tag 30 to a packet tagger 31 that resides within the input packet processor 28.

The signals received by the scanning beam antennas SBA and the intersatellite antennas ISA carry digitized packets of data 22. These packets 22 are fed along link 14 to the input port 27 of input packet processor 28. Each packet 22 comprises a string of ones and zeros, and is divided into two general sections called a header 24 and a payload 26. FIG. 13 provides a detailed view of the packet structure employed by the present invention. The payload 26 carries the "message" or substance of the communicated information conveyed by the packet 22. The header 24 includes the packet's destination address, which comprises a supercell, a cell and a channel. In this specification, the terms "supercell address" 21A, and "cell address" 21B and "channel identification" 21C may be used to refer to numerical representations of a supercell, cell, and channel that are used as vital parts of the switching process.

The input packet processor 28 receives an asynchronous sequence of packets 22 in a serial transmission format through its input port 27. Each packet 22 contains information in its header section 24 that enables switching circuitry aboard the satellites S to route the packets 22. The input packet processor 28 first reads destination address 32 that specifies a particular supercell and cell address from each packet 22 and uses it as an index to read a fast packet switch output port tag 30 from the routing cache memory 20 through access port 18. The routing cache memory 20 contains a table which associates supercell addresses 21A with fast packet switch output port tags 30. In general terms, this output port tag 30 selects a scanning beam antenna SBA for the final transmission of the packet 22 to its ultimate destination at a portable, mobile or fixed terminal or gateway P, M, F, G. The information stored in the routing cache memory 20 is continuously updated by the adaptive routing processor 12A, which constantly calculates link delays based on information concerning satellite positions and traffic congestion within the network. Since the routing cache memory 20 is used by more than one input packet processor 28, a time-sequencer or multiple cache memories 20 can be used to eliminate contention problems that occur when more than one input packet processor 28 seeks the services of the routing cache memory 20.

The output 33 of the input packet processor 28 is a tagged packet 34 which has a fast packet switch output port tag 30 prepended to its header 24. Tagged packets 34 are delivered to the input port 36 of fast packet switch 38. The output port tag 30 is used by the fast packet switch 38 to transport the tagged packet 34 to an appropriate output port 40 of the fast packet switch 38.

FIG. 1E reveals the details of the function of the routing cache, memory 20, which is essentially a look-up table that is constantly updated with information 12C from the adaptive routing microprocessor 12A. The routing cache memory 20 functions like a library that associates supercell addresses 21A with specific output ports 40 on the fast packet switch 38. The data in the memory 20 is constantly refreshed by the AR microprocessor 12A with the latest information that is available to each satellite S in the network.

If the packet 22 is addressed to a destination that is being served by a supercell 21A controlled by the satellite at that moment in time, the packet 22 will be conveyed to one of the satellite's scanning beam antennas SBA for the final segment of its journey to a portable, mobile or fixed terminal P, M, F or to a gateway G. If, however, the packet 22 is addressed to a destination that is not being served by a supercell 21A controlled by the satellite at that moment in time, the packet 22 must be routed to one of the satellite's intersatellite antennas ISA for transmission to one of its eight closest neighboring satellites.

The packet tagger 31 affixes the tag 30 to the header 24 of the packet 22, and the tagged packet 34 is conveyed out of output port 33 of the input packet processor 28 to the input port 36 of the fast packet switch 38.

IV. Satellite Switch Node Architecture

FIG. 2 presents a block diagram which provides a broad overview that depicts the environment of a satellite switch node 42 which includes the hardware and software which implements the flow diagram 10 of FIG. 1D. One fast packet switch 38 is shown in the upper portion of the diagram, and receives signals from a series of circuit modules 44 and 28. Module 44 includes a receiver 46 coupled to receive antennas (not shown in FIG. 2), a demodulator 48, and a bit/packet synchronizer 50. Module 28 provides input packet control, and comprises circuits for error detection 54, packet tagging 31, local cache access 58 and network cache access 60. The series of input packet processor modules 28 are also connected to a control complex 62 through a local routing cache 76 and a local routing and handover processor 74. Another link to the input packet control modules 52 is coupled to the control complex 62 through a network routing cache 80 and a network management and routing processor 78. The control complex 62 is an array of circuit stages that include a signaling and call control processor 64, a test and maintenance processor 66, a system control and reload processor 68, a billing and traffic processor 70 and a satellite ephemerides processor 72. The control complex 62 is coupled to a communications processor 82, a spare processor 84 and a beam steering processor 86, which is connected to output packet control modules 90 and 96. Output packet control modules 90 comprise circuits that keep track of path history in a path history module 92 and perform error encoding in an error encoding module 94. Output packet control modules 96 include packet framing circuits 98, modulators 100 and transmitters 102 connected to transmit antennas (not shown in FIG. 2). Each fast packet switch output port 40 is coupled through a path history module 92 to an output packet control module 96 which is responsible for passing each packet 22 to the next-node-in path destination.

V. The Fast Packet Switch

As shown best in FIG. 3, the switch 38 conveys the tagged packet 34 from a 150 mbit/second serial input 36 to one of thirty-two multi-stage self-routing switch modules 132 within it. The tag 30 is read by a self-routing switch module 132, and is routed to one of thirty-two asynchronous packet multiplexors 134. The multiplexor 134 conveys the tagged packets 34 received in parallel from various input ports 36 into a serial output stream at one of its output ports 40. The details of each self-routing switch module 132 are shown in FIG. 4, while the details of each multiplexor 134 are shown in FIG. 5.

FIG. 4 reveals the process that is employed to route a tagged packet 34 through a self-routing switch module 132. A tagged packet 34 entering the module 132 carries the output port routing tag 30 that was affixed to it by packet tagger 31. Each bit in the routing tag 30 is extracted from the header and then read by a series of self-routing cells 138. Each self-routing cell 138 has one input and two outputs. If the first bit that is stripped and read from the routing tag 30 is a zero, the first cell 138 routes the packet 34 to the "zero" output. Conversely, if the first bit that is stripped and read from the routing tag 30 is a one, the first cell 138 routes the bit to the "one" output. Each successive cell 138 reads the first packet 34 presented to it in the tag 30. As a consequence, the second cell strips and reads the original second bit, the third cell strips and reads the original third bit, the fourth cell strips and reads the original fourth bit, and so on. FIG. 4 shows how the route for the packet 34 is charted across the module 132, step by step, through a series of six self-routing cells 138 by reading the first six bits of the tag 30 on the packet 34. Once the pathway is complete, the packet passes from the input 36 to one of the thirty-two output ports 140 of the module 132.

As best viewed in FIG. 3, outputs from the self-routing modules 132 are conveyed by serial interconnecting links to the inputs of the thirty-two 32×1 asynchronous packet multiplexors 134 which also reside in the fast packet switch 38.

Packets 142 that have emerged from the output 140 of the self-routing switch modules 132 enter one of the multiplexors 134 through one of the thirty-two 150 Mbit/second serial inputs. The packets 142 are first processed by a serial-to-parallel (S/P) converter 108, and are then passed into a first in, first out (FIFO) buffer 110. A scan and control (S&C) 112 monitors the contents of each FIFO buffer 110.

The heart of the multiplexor 134 is a FIFO scanning and control logic circuit 114. This circuit manages the scan and control circuits 112, and is connected to an output queue status circuit 116. Each FIFO buffer 110 is linked to an 8 bit parallel 150 Mbit per second bus 117. After packets 142 arrive from the self-routing modules 132, are converted by the serial-to-parallel converters 108, and are placed into a buffer 110, the FIFO scanning and control logic 114 moves each packet 142 to the bus 117 based on various priority criteria. A priority router 118 assists in the selection of which packets 142 are forwarded to an 8 by 16 low priority FIFO buffer 120 and an 8 by 16 high priority FIFO buffer 122. Before being emitted from an 150 Mbit per second serial output 126, the packets 142 are converted again by a parallel-to-serial converter 124.

VI. The Non-Blocking Feature

The non-blocking feature of the fast packet switch 38 is embodied in the fixed connections among the self-routing switch modules 132 and the asynchronous packet multiplexors 134. FIG. 3 depicts thirty-two switch modules 132 and thirty-two multiplexors 134. Each switch module 132 and multiplexor 134 is numbered from one to thirty-two. Each self-routing switch 132 has one input port and thirty-two output ports. Conversely, each multiplexor 134 has thirty-two inputs and only one output. In FIG. 3, this sequential number appears on the lower left corner of each switch module 132, and on the lower right corner of each multiplexor 134.

The first output port of the first self-routing switch module 132 (numbered "1") is permanently connected to the first input of the first multiplexor 134 (numbered "1") in the fast packet switch 38. The second output of the second switch module 132 (numbered "2") is permanently connected to the first input of the second multiplexor 134 (numbered "2"). In this section of the specification, the variables "i" and "j" are used to represent a particular switch module numbered from one to thirty-two and one of thirty-two outputs on that switch module. For example, the pair of variables i=2, j=3 is used to represent the third output port on the second switch module from the top of the drawing in FIG. 3. Similarly, the pair of variables "m" and "n" are used to represent a particular input on the multiplexor from one to thirty-two and a specific multiplexor numbered from one to thirty-two. For example, the pair of variables m=5, n=1 to the fifth input on the first multiplexor from the top of the drawing in FIG. 3.

Using this algebraic representation of each switch module (i) and its outputs (j)and each input (m) on each multiplexor (n), the first three connections between the first switch module (132) and three multiplexors (134) can be described as follows:

For the first switch module (i=1):

The first output (j=1) is connected to the first input (m=1) on the first multiplexor (n=1).

The second output (j=2) is connected to the first input (m=1) on the second multiplexor (n=2).

The third output (j=3) is connected to the first input (m=1) on the third multiplexor (n=3).

These relationships can be summarized by a table:

| i | j | m | n |
|---|---|---|---|
| 1 | 1 | 1 | 1 |
| 1 | 2 | 1 | 2 |
| 1 | 3 | 1 | 3 |

The connections between the first switch module and the thirty-two multiplexors can also be described as a general rule: For the first switch module (i=1), i=m and j=n.

Similarly, for the second switch module (i=2), the first three lines of the table would be:

| i | j | m | n |
|---|---|---|---|
| 2 | 1 | 2 | 1 |
| 2 | 2 | 2 | 2 |
| 2 | 3 | 2 | 3 |

Again, the same rule for this embodiment is applicable, i=m and j=n. This connection architecture is non-blocking because even if thirty-two packets, which are all addressed to the same destination, arrive at the fast packet switch simultaneously, this configuration processes all of the thirty-two packets without delays. The same basic connection rules that are described above may be used to build fast packet switches which have sixty-four or more input/output paths. The description of a particular thirty-two pathway embodiment set out above is intended to educate the reader, but is not intended to limit the scope of the claims which follow this specification.

VII. Node Hardware Architecture & The Routing Process

FIG. 6 is a schematic diagram of node hardware architecture 200 employed by the present invention. A common control stage 202 aboard each satellite S is capable of conveying internode messages 204 and 206 to receivers 208 and transmitters 210 which communicate with the other satellites S in the constellation. The common control stage 202 is also linked to a fast packet switch 38, which forwards routed packets 22 to other satellites S, to gateways G or to subscribers using portable P, mobile M or fixed F terminals.

The routing process is illustrated in the flow diagram 214 shown in FIG. 7. Service demand 216 from subscribers 218 situated around the world prompt the routing algorithm 16 to determine optimum pathways for call traffic using routing tables 220 and other local processes 222. FIG. 8 exhibits dynamic packet routing in diagram 224. The router 226 uses entries stored in routing tables 220 to instruct packet routers 228 how to process packets 22 to a sorting network 230 and associated transmitters 232. Packets 22 generated at traffic sources are switched through the network in a store-and-forward fashion. The router 226 at each hop forwards the packet to the next hop, minimizing the packet end-to-end delay which the packet experiences in its trip from the source to the destination. The decision of how to forward a packet 22 is determined by each hop independently with no a-priori or static route determination. Routing decisions are based on the latest information available to the router at the switching hop, and reflect dynamic global network considerations as well as the local node considerations. In the one of the preferred embodiments, both satellites S and gateways G possess routing capabilities, so the term "node" is used to refer both to satellites and to gateways. A gateway is treated simply as a stationary satellite. The term "routing" not only includes the process of directing each packet at each node, but embraces the related operations of controlling traffic flow, overloads and congestion and optimizing traffic distribution.

FIG. 9 presents a schematic depiction 233 of the transmission between a portable P, mobile M or fixed F terminal and several satellites S in the orbiting constellation 234. A number of satellites S may be involved in routing the call from the terminal P, M or F to its destination at a gateway G. In this case, the gateway G is connected to a public switched telephone network (PSTN) 238. During the call routing process, some of the satellites S may consult with a subscriber database 235, feature processors 236 or a routing database 237.

A block diagram of an output module 240 is revealed in FIG. 10. An input 241 is conveyed into a fiber optic receiver 243 which is coupled to an input output module (IOM) that is linked to a fiber distributed data interface (FDDI) 242. Signals from the receiver 243 flow into a packet decoder 244, and then are split into separate pathways 245 and 246 for traffic from fixed and mobile terminals. Supercell decoders 247 pick a supercell as a route for each packet 22, and a series of thirty-two channel decoder stages 248 for both the fixed terminal traffic and mobile terminal traffic select channel assignments for the packets 22 which are sent to transmit encoders 249 (not shown in this Figure).

FIG. 11 furnishes a schematic diagram 250 of a circuit stage called a 7:1 concentrator 252. This device cuts down the number of ports on the fast packet switch 38 by substituting a relatively small number of high speed ports for a relatively large number of low speed ports. The concentrator 252 comprises statistical multiplexors, and distributes traffic more evenly among the links in the network. A group of receivers labeled 254 and 256 represent traffic handled by two sets of thirty-two receivers for mobile and fixed terminal calls. The seven-to-one concentrator 252 converts an input rate 258 of 24.480 Mbits per second to 3.544 Mb/s. The concentrator 252 is coupled to a series of transmitters 260 and to an input output module (IOM) 264 central processing unit (CPU). The IOM CPU 264 is also linked to the FDDI ring 242 through an FDDI server 262.

FIG. 12 presents a schematic illustration 266 that shows the details of the environment of the fast packet switch 38. Packets 22 flow into a series of forty-two input module multiplexors (IM MUX 1/42–42/42) 268 coupled to concentrator 252, and then over 170 Mb links 270 to an array of input packet processors (IPP) 28. Packets 22 from gateway satellite links (GSL) 274, inter-satellite links (ISL) and mobile terminal satellite links (MTS) 278 are also received by the IPP array 28. Packets from the IPPs 28 are forwarded to switch 38, where traffic from the input modules 268 is fed to an array of forty-two facility multiplexors (FACIL MUX 1/42–42/42) 280. Output from the facility multiplexors 280 is conveyed to output module supercell and cell demultiplexors (OM DEMUX 1/42–42/42) 282. Call traffic bound for gateways G, other satellites S, and mobile terminals M exit the switch to links labeled 288, 290 and 291 respectively.

FIG. 13 reveals the structure of packets 22 which are conveyed through the network. In the preferred embodiment, all packets 22 conveyed through the network are 512 bits long. The first portion of the packet is a header 24 comprising 80 bits. The header 24 is a collection of control fields that define the packet priority and type and contain routing information. A routing field within the header 24 includes a destination field that contains a destination node and a specific call/delivery identification within the destination node. A 416 bit payload and a 16 bit cyclic redundancy check (CRC) accompany the header. The payload 26 carries the substance of the message which the packet transports, and the CRC is used to detect errors. The structure recited above is used as a basis for all of the discussion and examples which appear in this document.

FIGS. 14 and 15 furnish schematic representations 292 and 310 of the lines of communication between the fast packet switch 38, the FDDI token ring 242 and links to the world outside each spacecraft S. In both figures, a central control unit 294 that includes a central processor 298 and a message transport unit 296 coordinate the flow of signals from gateways G over gateway satellite links (GSL) 300, inter-satellite links (ISL) 302, fixed terminal links (FTL) 304 and mobile terminal links (MTL) 306. A multiple access controller 308 oversees signals conveyed to and received from each satellite's antennas.

The relationship among the fast packet switch 38 and a series of input output packet processor (IOP) units 314 are illustrated in a schematic depiction 312 provided by FIG. 16. Chart 316 in FIG. 17 explains how traffic from gateways G must be processed through modems 318 and a switching matrix 320 before it is received by the IPP array 28 and the fast packet switch 38.

FIG. 18 offers a schematic diagram 322 which supplies a detailed view of a high level representation of a portion of the self-routing network within the fast packet switch 38 that routes packets 22 by examining bits in the tag added by the output processor units. A decoder 324 works with routing elements 326 coupled together in an array to perform the packet sorting procedure.

FIG. 19 supplies a schematic layout 328 which indicates the deployment of input output processor units 314 on the FDDI ring 242. Coaxial lines 329 and 330 convey radio frequency (RF) signals to and from the ring 242. The relationship among transmit and receive modems 334, input packet processor units 28, and output packet processors 314 is depicted in the block diagram 332 found in FIG. 20. FIG. 21 is a flow chart 336 that explains the flow of packets 22 to the switch 38. A central processing unit CPU 338 manages signals passing to and from the FDDI ring 242 through an FDDI server 340. Packets 22 are checked for errors by a CRC checker. Supercell, cell and channel assignments are supplied by a Call ID map 341, and are added to the header 24 of each packet 22. Routing instructions are also added to the header of the packet 22 after being determined by the cooperative action of the routing algorithm 219 and the routing tables 220. FIG. 22 reveals the association of the input packet processor units (IPP) 28 and an IPP common control unit 343, while an IPP four stage pipeline 344 is shown in FIG. 23.

FIG. 24 furnishes a flow chart 345 that explains the general process performed aboard each satellite to produce routing instructions. The router 226 onboard each satellite or node (n) generates a local estimate of the delay that would be encountered in transmitting a packet 22 to any other node (x). These delays are computed for each of its links 1, 2, . . . .L to other satellites, gateways and terminals. The delay realized by a packet in transit between two nodes in the network n and x over a particular link 1 is given by the expression:

Algorithm 1: $D(n, x, 1) = Tp(1) + Tq(1) + ND1(1^*, x)$

The quantity $Tp(1)$ is the current propagation delay for a link 1 which connects a local node n to the neighbor node terminating 1 at its remote edge. This neighbor is designated $1^*$ (the symbol * is used to mean "the successor of)". $Tp(1)$ varies with time as the distance between n and $1^*$ changes with satellite movement. $Tq(1)$ is the current link queuing delay consisting of two components, Tb and Ts. Tb represents the time spent by a packet in a buffer waiting for all the packets ahead of it to be transmitted. Ts is the actual packet transmission time once it gets to the queue head (called the service time). Ts is a function of the packet length and the link transmission bandwidth. The variable ND(1*, x) is the delay reported by neighbor 1* to n stating the least delay from itself (from neighbor node 1*) to destination node x. The router in n maintains a table ND1(1*, x) for each of its links, and reflects the most recent delay reported by neighbor 1* to each destination x. The terms Tp and Tq are derived by node n from local information, whereas the term ND1 (1*,x) represents the distributed term. From the routers' viewpoint, if load control issues are ignored, the optimal link from n to destination node x is that link 1 for which D(n, x, 1) is lowest. The actual link used by n to forward packets to x is not always the optimal link. If objectives concerning traffic load distribution are factored into the decision, another link may be chosen. In flowchart 345 shown in FIG. 24, the quantities Td, Tp and Tq are conveyed from the router map 346 within the router 226 and are processed by an optimal link select sequencer 347 to produce an optimal link tag that is used to route each packet 22.

FIG. 26 contains a flow diagram 358 that includes a message transport system 360. Packets 22 can be grouped into two general categories, those carrying user data comprising voice, video, digital data, etc.; and those carrying control messages that are used in network administration and control functions. Packets 22 passing through satellite nodes on their way to their final destinations may contain user data or control messages. If a particular packet 22 contains a control message for a satellite, it is delivered to the message transport system (MTS) 360. The MTS 360 communicates with internal circuitry and the outside world over the FDDI token ring 242.

FIG. 25 is a flowchart 348 which depicts the transit of a switched packet 142 from the output port 40 of switch 38 to transmission equipment. Switched packet 142 carrying cell and channel assignments and terminal packet indicator information 350 are fed to a cell decoder 352 which forwards each switched packet 142 to one of sixteen cell buffers 354 depending on the cell assignment carried in the packet header 24. Each cell buffer 354 contains a channel sorter 355 which sorts each packet by the channel to which it has been assigned. Three hundred and sixty channel buffers 356 within each cell buffer 354 hold packets until the appropriate transmission time arrives, and then the sorted packets are emitted from the buffers 354 to RF modulators and, eventually, the satellite antennas.

FIG. 27 exhibits the pathways within a 128×128 switch 362, while FIG. 28 is a schematic diagram of a single switching cell 364.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. Similarly, although one embodiment of a fast packet switch having thirty-two ports has been disclosed, the present invention may be practiced with switch hardware that provides sixty-four or any other number of ports. The List of Reference Characters which follows is intended to provide the reader with a convenient means of identifying elements of the invention in the specification and drawings. This list is not intended to delineate or narrow the scope of the claims.

LIST OF REFERENCE CHARACTERS

Figures 1A, 1B, 1C, 1D, 1E, 1F & 1G

| | |
|---|---|
| AOD | Autonomous Orbit Determination |
| AR | Adaptive Routing |
| B | Beam |
| CON | Constellation of satellites |
| E | Earth |
| EFG | Earth-fixed grid |
| F | Fixed terminal |
| FP | Footprint formed by beam from satellite on Earth's surface |
| G | Gateway |
| ISA | Intersatellite link antenna |
| M | Mobile terminal |
| OR | Orbits |
| P | Portable terminal |
| S | Satellite |
| SBA | Scanning beam antenna |
| SUB | Subscriber |
| T | Telephone |
| 10 | Flow chart of switching process |
| 11A | Autonomous orbit determination microprocessor |
| 11B | Autonomous orbit determination software |
| 11C | Orbital position information output |
| 12A | Adaptive routing microprocessor |
| 12B | Adaptive routing software |
| 12C | "Next-node-in-path-to-destination" output |
| 14 | Link from antennas carrying packets |
| 16 | Access port to routing cache memory |
| 18 | Access port to routing cache memory |
| 20 | Routing cache memory |
| 21A | Supercell address |
| 21B | Cell address |
| 21C | Channel identification |
| 22 | Packet |
| 24 | Header |
| 26 | Payload |
| 28 | Input packet processor |
| 30 | Fast packet switch output port routing tag |
| 31 | Packet tagger |
| 33 | Output port of input packet processor |
| 34 | Tagged packet |
| 36 | Input port of fast packet switch |
| 38 | Fast packet switch |
| 40 | Output port of fast packet switch |

Figures 2, 3, 4 & 5

| | |
|---|---|
| 42 | Satellite switch node |
| 44 | Circuit modules |
| 46 | Receiver |
| 48 | Demodulator |
| 50 | Bit/packet synchronizer |
| 52 | Input packet control modules |
| 54 | Error detection circuits |
| 56 | Packet tagging circuits |
| 58 | Local cache access |
| 60 | Network cache access |
| 62 | Control complex |
| 64 | Call control processor |
| 66 | Maintenance processor |
| 68 | Reload processor |
| 70 | Billing and traffic processor |
| 72 | Satellite ephemerides processor |
| 74 | Local routing and handover processor |
| 76 | Local routing cache |
| 78 | Routing processor |
| 80 | Network routing cache |
| 82 | Communications processor |
| 84 | Spare processor |
| 86 | Steering processor |
| 90 | Output packet control modules |
| 92 | Path history circuits |
| 94 | Error encoding circuits |
| 96 | Output packet control modules |

LIST OF REFERENCE CHARACTERS

| | |
|---|---|
| 98 | Packet framing circuits |
| 100 | Modulator |
| 112 | Transmitter |
| 104 | 32 × 1 packet priority multiplexor |
| 106 | Serial input signals |
| 108 | Serial-to-parallel converters |
| 110 | First-in, first-out buffering circuits |
| 112 | Status and control circuits |
| 114 | Logic circuitry |
| 116 | Output queue status stage |
| 117 | Eight bit parallel bus |
| 118 | Priority router |
| 120 | 8 × 16 K low priority first-in, first-out circuit |
| 122 | 8 × 16 K high priority first-in, first-out circuit |
| 124 | Parallel-to-serial converter |
| 126 | 150 MBIT/S serial output |
| 128 | Block diagram of fast packet switch |
| 130 | Serial inputs |
| 132 | 1 × 32 self-routing switch module |
| 134 | 32 × 1 asynchronous packet multiplexor |
| 136 | Schematic diagram of 1 × 32 self-routing switch module |
| 138 | Self-routing cell |
| 140 | Output side |
| 142 | Switched Packets |

Figures 6 through 27

| | |
|---|---|
| 200 | Node hardware architecture |
| 202 | Common control stage |
| 204 | Internode messages |
| 206 | Internode messages |
| 208 | Receivers |
| 210 | Transmitters |
| 214 | Routing process |
| 216 | Service demand |
| 218 | Subscribers |
| 219 | Routing algorithm |
| 220 | Routing tables |
| 222 | Local processes |
| 224 | Dynamic packet routing method |
| 226 | Router |
| 228 | Packet routers |
| 230 | Sorting network |
| 232 | Transmitters |
| 233 | Schematic diagram of call routing through constellation |
| 234 | Satellite constellation |
| 235 | Subscriber database |
| 236 | Feature processor |
| 237 | Routing database |
| 238 | Public switched telephone network |
| 240 | Output module |
| 241 | Output module input |
| 242 | FDDI |
| 243 | Fiber optic receiver |
| 244 | Packet decoder |
| 245 | Fixed terminal traffic |
| 246 | Mobile terminal traffic |
| 247 | Supercell decoder |
| 248 | Channel decoder stages |
| 249 | Output to transmit encoders |
| 250 | Diagram showing concentrator environment |
| 252 | Concentrator circuit |
| 254 | Receivers |
| 256 | Receivers |
| 258 | Concentrator input rates |
| 260 | Transmitters |
| 262 | FDDI server |
| 264 | IOM CPU |
| 266 | Fast packet switch environment |
| 268 | Input module multiplexors |
| 270 | IM MUX links |
| 274 | Traffic from GSLs |
| 276 | Traffic from ISLs |
| 278 | Traffic from mobile terminals |
| 280 | Facility multiplexors |
| 282 | Output module supercell and cell demultiplexors |
| 286 | OM output |
| 288 | Output to GSLs |
| 290 | Output to ISLs |

LIST OF REFERENCE CHARACTERS

| | |
|---|---|
| 291 | Output to mobile terminals |
| 292 | Schematic of packet switch and links |
| 294 | Central control |
| 296 | Message transport unit |
| 298 | Central processor |
| 300 | Gateway satellite links |
| 302 | Intersatellite links |
| 304 | Fixed terminal satellite links |
| 306 | Mobile terminal satellite links |
| 308 | Multiple access controller |
| 310 | Schematic showing FDDI token ring and links |
| 312 | Block diagram of IOPs and packet switch |
| 314 | Input output processors (IOP) |
| 316 | Chart showing GSL modems and switching matrix |
| 318 | GSL modems |
| 320 | GSL switching matrix |
| 322 | Self-routing network |
| 324 | Decoder |
| 326 | Routing elements |
| 328 | IOP units on FDDI ring |
| 329 | RF coax |
| 330 | RF coax |
| 332 | Block diagram of modems, IPPs, OPPs |
| 334 | Receive and transmit modems |
| 336 | Flowchart depicting packet routing |
| 337 | CRC checker |
| 338 | CPU |
| 340 | FDDI server |
| 341 | Call ID map |
| 342 | Block diagram of IPPs |
| 343 | IPP common control unit |
| 344 | IPP four stage pipeline |
| 345 | Flowchart showing use of time delay vectors to produce optimal link tag for packets |
| 346 | Time delay values from router map |
| 347 | Optimal link select sequencer |
| 348 | Flowchart depicting cell and channel sorting of packets |
| 350 | Cell, channel and terminal packet information |
| 352 | Cell decoder |
| 354 | Buffer for packets sorted by cell |
| 355 | Channel sorter |
| 356 | Buffer for packets sorted by channel |
| 358 | Flowchart showing message transport system |
| 360 | Message transport system |
| 362 | 128 by 128 switch |
| 364 | Single switching cell |
| | Td Time delay total |
| | Tp Current propagation delay |
| | Tq Current queuing delay |

What is claimed is:

1. Apparatus for directing a packet (22) having a header (24) and a payload (26) onboard a satellite (S) in earth orbit comprising:

an autonomous orbit determination microprocessor (11A);

said autonomous orbit determination microprocessor (11A) having a stored and continuously running autonomous orbit determination software (11B);

said autonomous orbit determination microprocessor (11A) further having an output containing orbital position information (11C);

an adaptive routing microprocessor (12A);

said adaptive routing microprocessor (12A) being coupled to said autonomous orbit determination microprocessor (11A);

said adaptive routing microprocessor (12A) having a stored and continuously running adaptive routing software (12B);

said adaptive routing microprocessor (12A) having an output containing a next-node-in-path-to-destination output (12C) derived from said output containing orbital position information (11C);

a routing cache memory (20);
    said routing cache memory (20) being coupled to said output of said adaptive routing microprocessor (12A), containing a next-node-in-path-to-destination output (12C);
    said routing cache memory (20) having a plurality of fast packet switch output port tags (30) stored in memory, each of said fast packet switch output port tags (30) being indexed by a supercell address (21A) which is part of said header (24);

an input packet processor (28);
    said input packet processor (28) being coupled to said routing cache memory (20);
    said input packet processor (28) having an input (27) through which said packet (22) is received;
    said input packet processor (28) having a software program which extracts said supercell address (21A) from said header (24) of said packet (22);
    said input packet processor (28) further having a software program which uses said supercell address (21A) as an index to read one of said plurality of fast packet switch output port tags (30) from said routing cache memory (20);
    said input packet processor (28) also having a packet tagger (31); said packet tagger having an output in which one of said fast packet switch output port tags (30) is prepended to said packet (22) to create a tagged packet (34); and a fast packet switch (38);
said fast packet switch (38) including
    a plurality of input ports (36), through one of which said plurality of input ports (36), said tagged packet (34) is received;
    a plurality of output ports (40);
    a plurality of multi-stage self-routing switch modules (132);
    a plurality of asynchronous packet multiplexors (134); said plurality of asynchronous packet multiplexors (134) being coupled to said plurality of multi-stage self-routing switch modules (132); and
    said plurality of multi-stage self-routing switch modules (132) and said plurality of asynchronous packet multiplexors (134) cooperating together to uniquely route said tagged packet (34) to one of said plurality of output ports (40) without contention with any other tagged packet (34).

\* \* \* \* \*